US007177043B2

(12) United States Patent
Qiao

(10) Patent No.: US 7,177,043 B2
(45) Date of Patent: Feb. 13, 2007

(54) INTERNET PRINTING METHOD, SYSTEM THEREOF, PROXY UNIT AND PRINT SERVER

(75) Inventor: Jingyu Qiao, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 659 days.

(21) Appl. No.: 10/046,882

(22) Filed: Jan. 17, 2002

(65) Prior Publication Data

US 2003/0030843 A1 Feb. 13, 2003

(30) Foreign Application Priority Data

Aug. 10, 2001 (JP) ............................. 2001-244689

(51) Int. Cl.
*G06F 15/00* (2006.01)
*G06K 1/00* (2006.01)
(52) U.S. Cl. .................... 358/1.15; 358/1.13; 709/203; 709/232; 709/236
(58) Field of Classification Search ............. 358/1.15, 358/1.13; 400/70; 710/220; 762/12; 709/203, 709/219, 227, 232, 236; 715/501.1; 726/12
See application file for complete search history.

(56) References Cited

U.S. PATENT DOCUMENTS

| 5,790,790 | A | | 8/1998 | Smith et al. | |
|---|---|---|---|---|---|
| 5,999,979 | A | * | 12/1999 | Vellanki et al. | 709/232 |
| 6,128,653 | A | * | 10/2000 | del Val et al. | 709/219 |
| 6,349,336 | B1 | * | 2/2002 | Sit et al. | 709/227 |
| 6,431,772 | B1 | * | 8/2002 | Melo et al. | 400/70 |
| 6,502,191 | B1 | * | 12/2002 | Smith et al. | 726/12 |
| 6,690,481 | B1 | * | 2/2004 | Yeung et al. | 358/1.15 |
| 6,748,471 | B1 | * | 6/2004 | Keeney et al. | 710/220 |
| 6,868,455 | B1 | * | 3/2005 | Ariyama | 710/8 |
| 6,930,788 | B1 | * | 8/2005 | Iwamoto et al. | 358/1.15 |
| 6,938,202 | B1 | * | 8/2005 | Matsubayashi et al. | 715/501.1 |
| 6,968,356 | B1 | * | 11/2005 | Lakhdir | 709/203 |
| 6,992,782 | B1 | * | 1/2006 | Yardumian et al. | 358/1.13 |
| 2002/0080391 | A1 | * | 6/2002 | Sugiura et al. | 358/1.15 |
| 2002/0140971 | A1 | * | 10/2002 | Machida | 358/1.15 |
| 2004/0105122 | A1 | * | 6/2004 | Schaeffer | 358/1.15 |
| 2005/0198364 | A1 | * | 9/2005 | Val et al. | 709/236 |

FOREIGN PATENT DOCUMENTS

| JP | 4-155558 | 5/1992 |
|---|---|---|
| JP | 4-311243 | 11/1992 |
| JP | 6-103186 | 4/1994 |

(Continued)

*Primary Examiner*—Kimberly Williams
*Assistant Examiner*—Satwant Singh
(74) *Attorney, Agent, or Firm*—Westerman, Hattori, Daniels & Adrian, LLP.

(57) ABSTRACT

The Internet printing system for a client perform printing out to a print server that cannot circumvent a firewall by the Internet Printing Protocol (IPP). For a print server which cannot circumvent the firewall by IPP, a proxy unit which can communicate using IPP is installed on the Internet. A server site of the print server is opened on the proxy unit, and an IPP client regards the print server as a public IPP server opened on the Internet, and exchanges printing service requests and responses via the proxy unit. Since the proxy unit performs gateway conversion from IPP into another protocol, the client can print out to the print server circumventing the firewall by using IPP.

24 Claims, 30 Drawing Sheets

FOREIGN PATENT DOCUMENTS

| | | |
|---|---|---|
| JP | 8-286785 | 11/1996 |
| JP | 10-27043 | 1/1998 |
| JP | 10-187370 | 7/1998 |
| JP | 10-224494 | 8/1998 |
| JP | 11-53068 | 2/1999 |
| JP | 2000-172597 | 6/2000 |

\* cited by examiner

| PRINT | |
|---|---|
| ExPM SERVER NAME: | expp1@abc.com |
| ExPM PROXY NAME: | expp-proxy1.comnet.com |
| CONTINUE TIME OUT: | 60   SECOND |
| | OK    Cancel |

FIG. 7

| | | |
|---|---|---|
| version-number | 2 bytes | - required |
| operation-id (request) or status-code (response) | 2 bytes | - required |
| request-id | 4 bytes | - required |
| begin-attribute-group-tag | 1 byte | |
| uri(0x45) or nameWithLanguage(0x36) | 1 byte | |
| name-length (15) | 2 bytes | |
| job-client-addr | 15 bytes | |
| value-length (15) | 2 bytes | |
| client-address(ex. 172.022.022.022) | 15 bytes | |
| name-length (15) | 2 bytes | |
| job-client-port | 15 bytes | |
| value-length (4) | 2 bytes | |
| client-port-number(ex. 3302) | 4 bytes | |
| empty or rest of attribute | 0 or more | |
| end-of-attributes-tag | 1 byte | - required |
| data | y bytes | - optional |

80 (top of table)
81 (bracket around job-client-addr through client-port-number rows)

FIG. 8

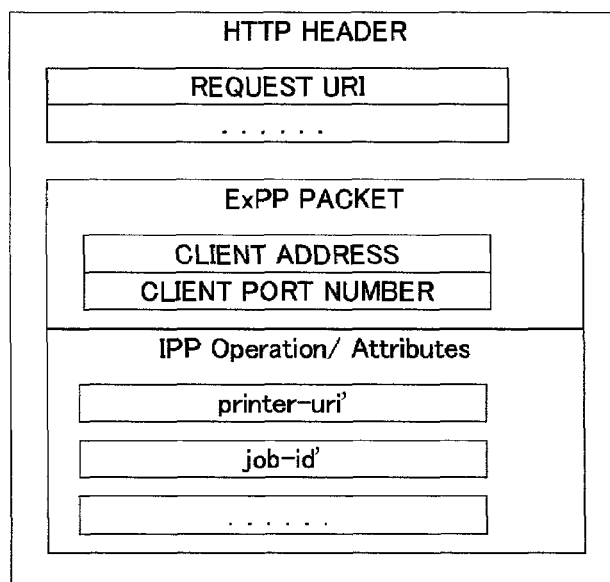

| MESSAGE HEADER | REQUEST LINE (REQUEST) STATUS LINE (RESPONSE) |
| --- | --- |
| | REQUEST/RESPONSE HEADER FIELD |
| | GENERAL HEADER FIELD |
| | ENTITY HEADER FIELD |
| | OTHERS |
| SPACE LINE | |
| MESSAGE BODY | |

| | | ROLE (WHEN CONNECTION) | ROLE (WHEN SERVICE) |
|---|---|---|---|
| CLIENT/ PROXY | ExPM CLIENT | Client | Client |
| | ExPM PROXY | Server | Server |
| PROXY/ SERVER | ExPM PROXY | Server | Client |
| | ExPM SERVER | Client | Server |

INTERNET PRINTING METHOD, SYSTEM THEREOF, PROXY UNIT AND PRINT SERVER

BACKGROUND OF THE INVENTION

1. Field of the Invention

The present invention relates to an Internet printing method, a system thereof, a proxy unit and a print server for transmitting printing data to a printer through the firewall of an organization from a client on the Internet and printing to that printer, and more particularly to an Internet printing method, a system thereof, a proxy system and a print server for printing data by a printer at a remote area under a firewall using IPP (Internet Printing Protocol) from outside a firewall.

2. Description of the Related Art

Today as the Internet spreads, methods for communicating by connecting various equipment and networks via the Internet are in use. As a method to share a printer in this inter-network, the IETF standardized IPP (Internet Printing Protocol) in RFC 2565-9, RFC 2616 and RFC 2639. IPP is described in detail in Chapter 18, "Sharing files and printers" of "TCP/IP Protocol and Service Guide", published by Nikkei BP Soft Press Co.

FIG. 37, FIG. 38 and FIG. 39 are diagrams depicting conventional Internet printing models. Internet printing by IPP has functions for the user to install, use and monitor a printer via an inter-network. By this, the client can access a printer via the Internet as if the printer were directly connected to a local area network (LAN) of a company.

In other words, the user can install a printer using a Web browser and additional Wizard software of the printer by IPP, and at this time the user can specify a URL (Uniform Resource Locator) or an IP (Internet Protocol) address instead of a UNC (Universal Naming Convention) path of a printer. Also output can be directly sent to a URL using the printer interface when a printing request is sent after the printer is installed.

As FIG. 37 shows, when an IPP client 110 and an IPP server (printer) 112 are directly connected with the Internet 100, printing by the printer 112 at a remote area is possible using IPP.

Also as FIG. 38 shows, a firewall 114 is disposed between an intranet and the Internet to protect security against network crimes which occur as the Internet develops.

A setting policy of the simplest and most typical firewall 114 is permitting all connections from inside the firewall to the outside, and permitting only connections to the public server with a restricted protocol for connections from outside the firewall to inside the firewall. Here the network outside the firewall is defined as an "extranet" and the network inside the firewall as an "intranet".

As FIG. 38 shows, the client 110 in the organization can print out to the printer 112, which is directly connected to the Internet 100, using IPP by setting a server (proxy server) to insure security (firewall).

However, as FIG. 39 shows, the client 110 cannot execute a print out to the printer 112 under the firewall 116, since an IPP packet cannot pass due to the protection of the firewall 116.

On the other hand, FIG. 39 shows a request for the client 110 to execute a print out to the printer 112 under the firewall 116 via the Internet 100 using IPP. This is an example when a member of a company prints out to the printer 112 under the firewall 116 of the company from home or outside the company via the Internet 100, or when an individual outside the company executes a print out to the printer 112 under the firewall 116 of the company via the Internet 100 at the request of the company.

As a method of printing by circumventing the firewall, it is proposed that print data is attached to an electronic mail, is converted to SMTP (Simple Mail Transfer Protocol), and is printed (e.g. Japanese Patent Laid-Open No. H10-187370).

With this method of using an electronic mail, however, the following problem occurs. This method is inappropriate for printing a large volume of print data since a mail server may restrict the mail size. Also accurate printing is not guaranteed with electronic mail. Also the printer status and printing status cannot be acquired.

SUMMARY OF THE INVENTION

With the foregoing in view, it is an object of the present invention to provide an Internet printing method, a system thereof, a proxy unit and a print server for printing data by a printer circumventing the firewall using IPP.

It is another object of the present invention to provide an Internet printing method, a system thereof, a proxy unit, and a print server for printing a large volume of data by a printer circumventing the firewall using IPP.

It is still another object of the present invention to provide an Internet printing method, a system thereof, a proxy unit, and a print server for printing data by a printer circumventing the firewall using IPP while checking the status of the printer.

It is still another object of the present invention to provide an Internet printing method, a system thereof, a proxy unit, and a print server for printing data by a printer using a private address of an intranet circumventing the firewall.

To achieve these objects, the present invention is an Internet printing method for a client to control the printing of a print server via the Internet using the Internet Printing Protocol, comprising: a step of opening a server site of the print server in a proxy unit on the Internet according to a request from one of the client and the print server; a step of the client accessing the server site using the Internet Printing Protocol; and a step of converting the printing service request of the client using the Internet Printing Protocol to a protocol which allows circumventing the firewall of the print server, and transferring the request to the print server according to the access.

The Internet printing system of the present invention comprises a client which communicates at least by the Internet Printing Protocol, a print server which is protected by a firewall on the Internet and executes a printing request, and a proxy unit which opens a server site of the print server according to a request from one of the client and the print server, converts the printing service request of the client using the Internet Printing Protocol to a protocol which allows circumventing the firewall of the print server at the access of the client to the server site by the Internet Printing Protocol, and transfers the request to the print server.

The proxy system of the present invention opens a server site of the print server according to the request from one of the client and print server, converts the printing service request of the client by the Internet Printing Protocol to a protocol which allows circumventing the firewall of the print server at the access of the client to the server site by the Internet Printing Protocol, and transfers the request to the print server.

Also the print server of the present invention requests a proxy unit installed on the Internet to open a server site of the print server, receives a printing service request from the proxy unit where the printing service request of the client by Internet Printing Protocol is converted into a protocol which allows circumventing the firewall of the print server at the access of the client to the server site by the Internet Printing Protocol, and executes a printing service request.

According to the present invention, a proxy unit which can communicate by the Internet Printing Protocol (IPP) is installed for a print server which cannot circumvent the firewall by IPP and the server site of the print server is opened in the proxy unit, so the client can exchange a printing service request and response regarding the print server as an IPP server opened on the Internet. Since the proxy unit performs gateway conversion from IPP into another protocol, the client can print out to a print server circumventing the firewall.

It is preferable in the present invention that the method further comprises a step of returning the execution result of the print server for the printing service request to the proxy unit, and returning the execution result to the client by the Internet Printing Protocol. As a result, the client can execute a job while monitoring the printer status by IPP.

It is preferable in the present invention that the method further comprises a step of connecting the proxy unit and the print server according to the connection request from the print server, so as to connect with an IPP server opened on the Internet.

Also in the present invention, it is preferable that the proxy unit plays the role of a server and the print server plays the role of a client when the proxy unit and the print server are connected, and the proxy unit plays the role of a client and the print server plays the role of a server when a printing service is requested after the connection. As a result, the print server can request a connection from inside the firewall to the outside, and the proxy unit can request a printing service.

It is also preferable that the present invention further comprise a step of transmitting a printing command from the client to the print server by a protocol which allows circumventing the firewall, and a step of connecting the proxy unit and the print server according to a connection request from the print server corresponding to the printing command. As a result, the present invention can be implemented simply by adding a mail function to the IPP client.

It is also preferable that the present invention further comprise a step of transmitting a printing command from the client to the proxy unit by the Internet Printing Protocol, a step of transferring the printing command from the proxy unit to the print server by a protocol which allows circumventing the firewall, and a step of connecting the proxy unit and the print server according to a connection request from the print server corresponding to the transferred printing command. As a result, the present invention can be implemented without adding unnecessary functions to an IPP client.

It is also preferable that the present invention further comprise a step of constantly connecting the proxy unit and the print server according to a connection request from the print server, so that the present invention can be implemented simply.

DESCRIPTION OF THE DRAWINGS

FIG. 7 is a format diagram of an External Printing Protocol (ExPP) of the system in FIG. 1;

FIG. 8 is a format diagram of another ExPP of the system in FIG. 1;

DESCRIPTION OF THE PREFERRED EMBODIMENTS

Embodiments of the present invention will now be described with reference to the accompanying drawings in the sequence of Internet printing system, Internet printing method, first embodiment, second embodiment, third embodiment, and other embodiments.

[Internet Printing System]

Figure 1:
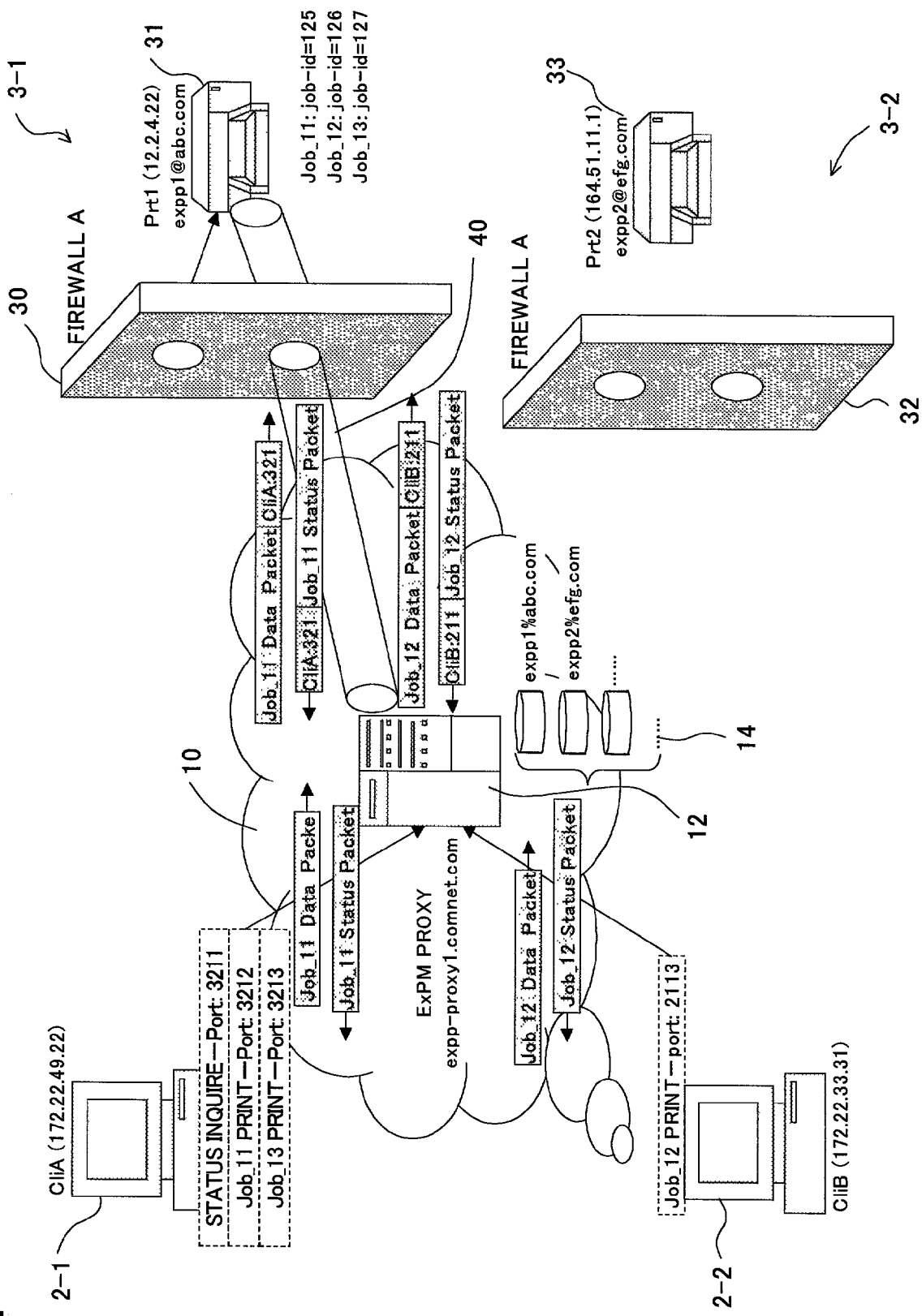
FIG. 1 is a block diagram of the Internet printing system of an embodiment of the present invention.
Figures 2, 3:
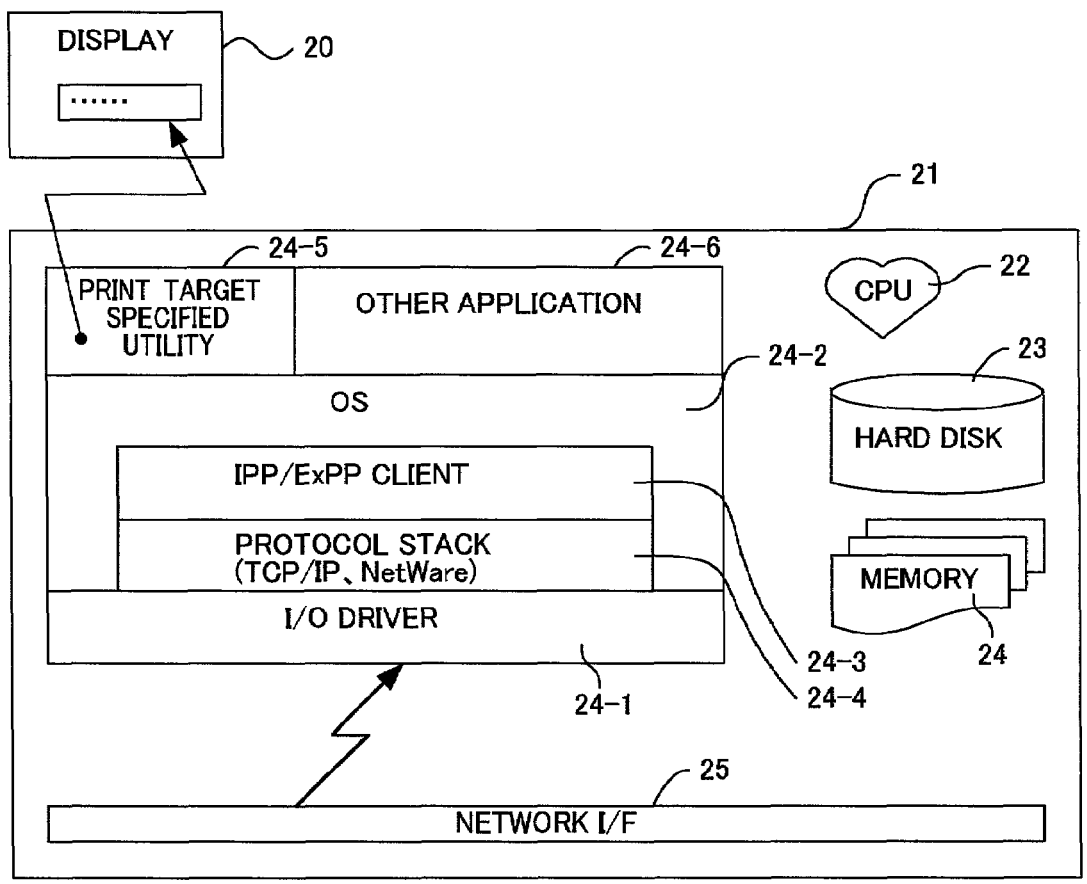
FIG. 2 is a block diagram depicting a client of the system in FIG. 1.
FIG. 3 is a diagram depicting a printing setup screen of the client in FIG. 2.
Figure 4:
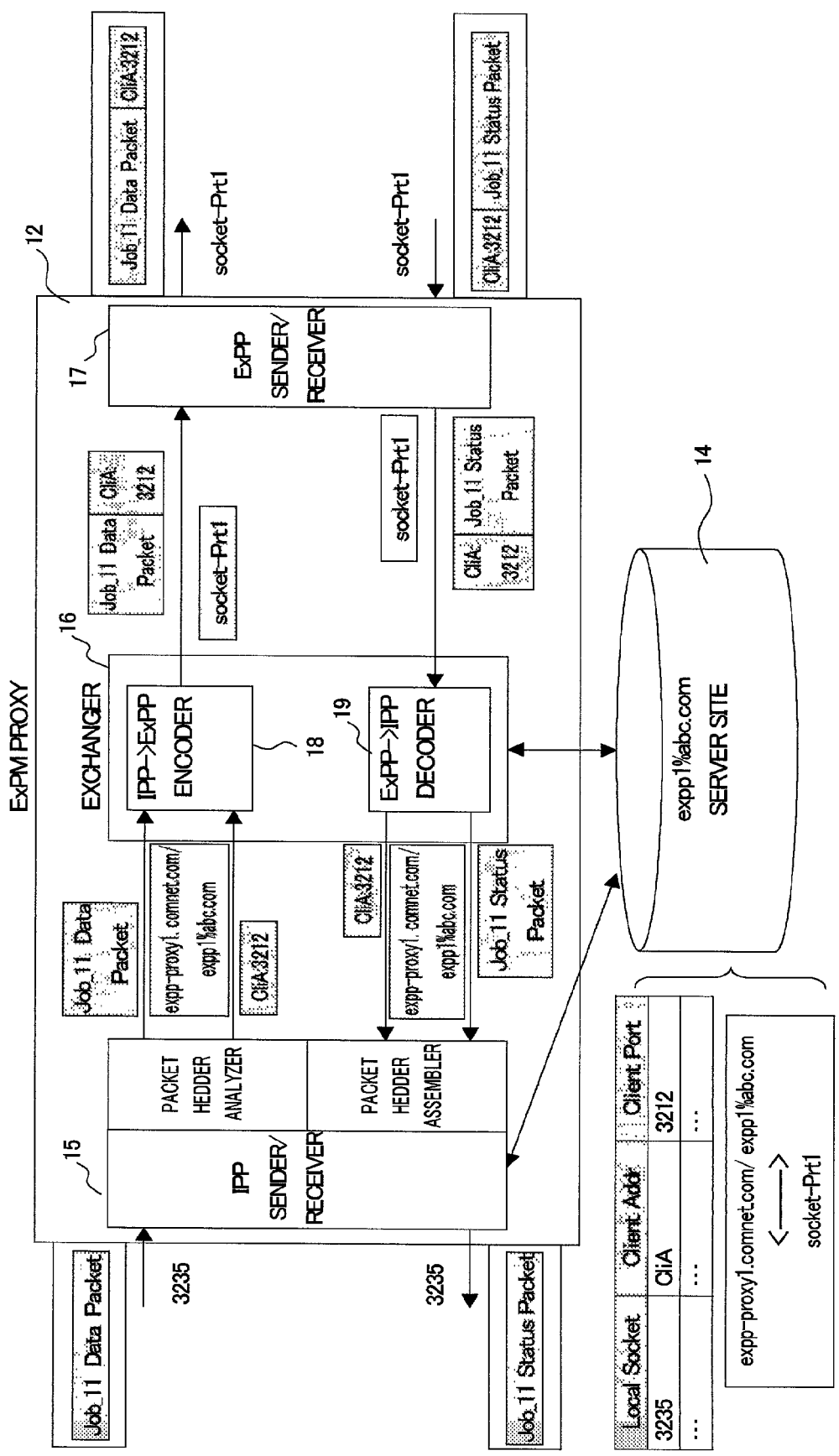
FIG. 4 is a block diagram depicting the proxy unit of the system in FIG. 1.
Figure 5:
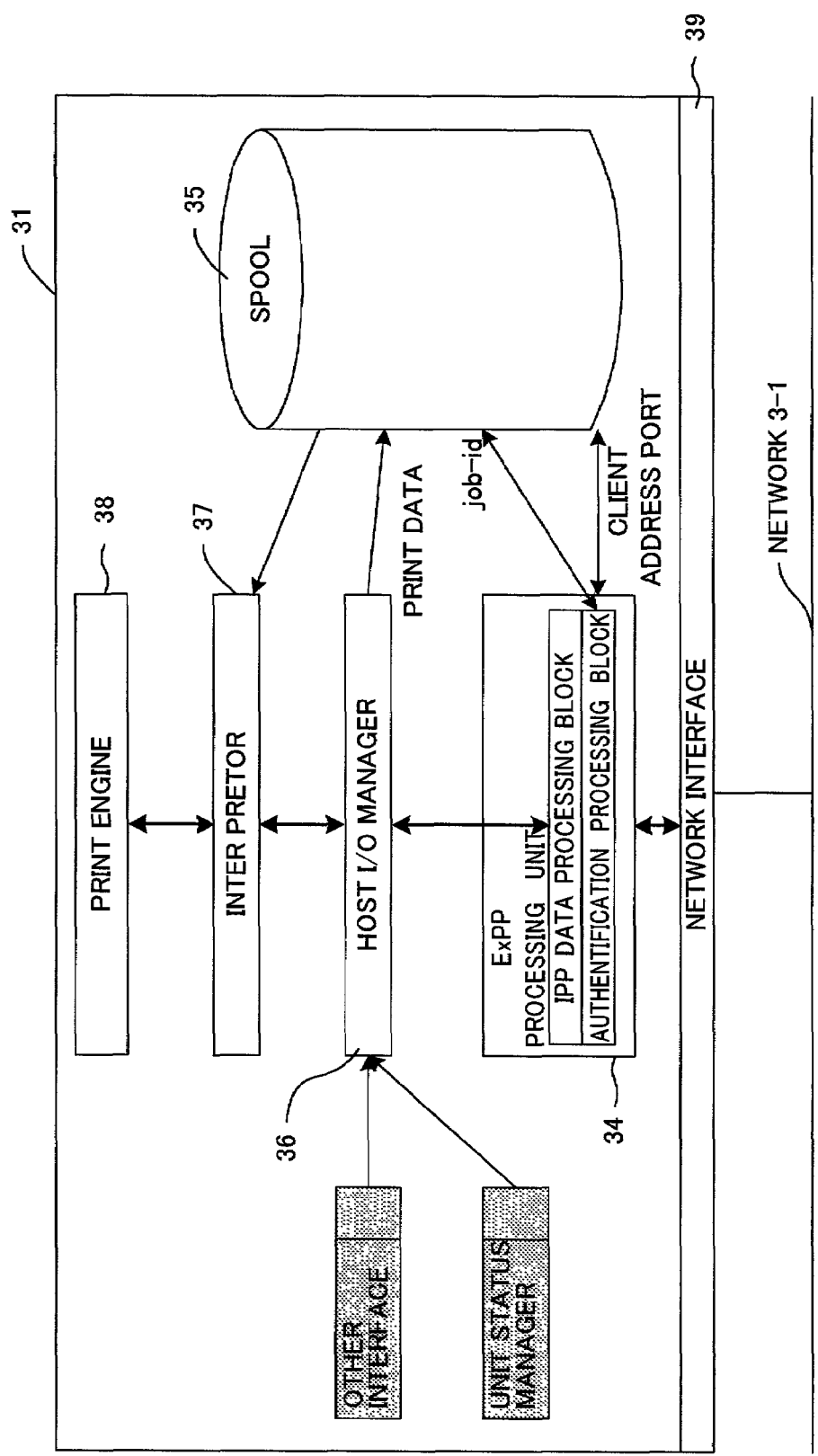
FIG. 5 is a block diagram depicting the print server of the system in FIG. 1.

FIG. 1 is a block diagram of an Internet printing system of an embodiment of the present invention, FIG. 2 is a block diagram of the client thereof, FIG. 3 is a diagram depicting a screen to specify the printing target printer, FIG. 4 is a block diagram of a proxy unit, and FIG. 5 is a block diagram of the print server thereof.

As FIG. 1 shows, clients 2-1 and 2-2, a proxy unit (gateway unit) 12, and network systems 3-1 and 3-2 are connected to the Internet 10. In this system, inside the firewall is defined as an "intranet", and outside the firewall is defined as an "extranet (Ex)". And the printing model that circumvents the firewall in this system is called the "ExPM" (Extranet Printing Model).

The ExPM clients 2-1 and 2-2 are hosts on the extranet, which request printing to the later mentioned ExPM servers 31 and 33. The ExPM (Extranet Printing Model) servers 31 and 33 are printers on the intranet that are protected by the firewalls 30 and 32 on the networks 3-1 and 3-2, LANs for example.

The ExPM (Extranet Printing Model) proxy 12 is a proxy server that receives and converts a print job from the ExPM clients 2-1 and 2-2 instead of the ExPM servers 30 and 33.

In this system, the printers 31 and 33 have their own mail accounts instead of URLs. Since a mail account is unique and known to the public on the Internet, the station of the extranet can specify the printers 31 and 33 using a private IP (Internet Protocol) address.

"expp1@abc.com" in FIG. 1 is the public name of the printer 31 on the intranet 3-1. This system is characterized in that the printers (ExPM servers) 31 and 33 on the intranet appear to be normal IPP (Internet Printing Protocol) servers using the ExPM proxy server 12. (Details will be described later.) An address mapping method leading to this printer is specified by proxy server URL+ExPM server account (@converted to %). In the case of the example in FIG. 1, the address mapping method is specified by "exppproxy1.comnet.com/exppl%abc.com".

FIG. 2 shows the configuration of the ExPM client 2-1 or 2-2, and FIG. 3 shows the printing specification screen. As FIG. 2 shows, the client 2-1 or 2-2 is comprised of a display unit 20 and a processing unit 21. The processing unit 21 is comprised of a CPU (processor) 22, a hard disk 23, a memory 24, and a network interface block 25.

The software deployed in the memory 24 is comprised of an I/O (Input/Output) driver 24-1, an OS (Operating System) 24-2, a printing target specification utility 24-5, and another application 24-6. In this OS 24-2, an IPP/ExPP (Extranet Printing Protocol) client function 24-3, a protocol stack (TCP (Transmission Control Protocol)/IP (Internet Protocol), and Netware) 24-4 are embedded.

FIG. 3 is a diagram depicting a printing specification screen which is displayed on the display unit 20 by the printing target specification utility 24-5. As FIG. 3 shows, in the printing specification screen, the names of the ExPM servers 31 and 33 at the print destination, the name of the ExPM proxy 12, and "Specification OK/Cancel" are specified.

In other words, the ExPM clients 2-1 and 2-2 primarily implement the following functions by the printing target specification utility 24-5, the IPP/ExPM client function 24-3 and the protocol stack 24-4.

(1) Specifies the ExPM servers 31 and 33 at the print destination and the ExPM proxy 12, (2) Issues a printing command to the ExPM server account, (3) Connects to the ExPM proxy 12 by IPP, acquires the status of the printers 31 and 33, and transfers the print job, and (4) Disconnects the ExPM proxy 12 after printing completes.

As the block diagram in FIG. 4 shows, the ExPM proxy 12 is comprised of an IPP transmission/reception block 15, a protocol exchanger 16, an ExPP transmission/reception block 17 and an ExPM server site 14. The IPP transmission/reception block 15 is comprised of a packet header analysis block and a packet header assembly block. The protocol exchanger 16 is comprised of an encoder 18 for converting IPP to the later mentioned ExPP (Extranet Printing Protocol), and a decoder 19 for converting ExPP to IPP.

In other words, the ExPM proxy 12 has the following major functions.

(1) Receives a connection request of the ExPM clients 2-1 and 2-2 or the ExPM servers 31 and 33, and creates the ExPM server site (spool) 14.

(2) Converts the printer status sent from the ExPM servers 31 and 33 by such protocols as HTTP (Hyper Text Transfer Protocol)/FTP (File Transfer Protocol) into IPP format, and returns it to the ExPM clients 2-1 and 2-2 by IPP.

(3) Converts a job sent from the ExPM clients 2-1 and 2-2 by IPP into the protocol (e.g. HTTP, FTP or other) of the ExPM servers 31 and 33, and transfers it to the ExPM servers 31 and 33.

(4) ExPM proxy 12 releases its support information to the public on the Internet as an ExPM description file to specify the communication protocol with the ExPM servers 31 and 33, and the ExPM servers 31 and 33 access this file by HTTP and select the optimum protocol. This minimizes support of the HTTP protocol for the ExPM proxy 12.

(5) Disconnects the session with the ExPM servers 31 and 33 when printing requests from all the clients have processed, and deletes the site page.

As the block diagram in FIG. 5 shows, the ExPM server 31 is comprised of an ExPP processing block 34, a spooler 35, a host I/O management block 36, an interpreter 37 and a printing block 38. The ExPP processing block 34 is further comprised of an IPP data processing block and an authentication processing block. The printing block 38 is further comprised of a printing engine, such as an electro-photographic mechanism, and a printing control block.

This ExPM server 31 has the following major functions.

(1) Receives a request mail from the ExPM clients 2-1 and 2-2, or from the ExPM proxy 12, and connects to the specified ExPM proxy 12.

(2) Mirrors the self-status to the ExPM proxy 12 with such a protocol as HTTP/FTP.

(3) Acquires and prints the job which was transferred from the ExPM clients 2-1 and 2-2 to the ExPM proxy 12.

Although the ExPM server shown here has a printing block 38, the definition of the ExPM server (print server) 31 of the present invention includes an ExPM server having only the ExPP processing block 34 and the network interface block 39, and an ExPM server which printing block is separate.

The general printing flow will now be described with reference to FIG. 1.

[1] The ExPM clients 2-1 and 2-2 specify the printing target printers 31 and 33. As FIG. 3 shows, the ExPM server name and the ExPM proxy name are specified by the ExPM clients 2-1 and 2-2.

[2] The ExPM client 2-1 sends the printing command mail to the target printer "HYPERLINK 'mailto:exppl@abc.com' exppl@abc.com" using SMTP. This mail includes the content of the ExPM proxy name. Then the ExPM client 2-1 connects to the ExPM proxy 12 using IPP. The connected URL (referred to as the printer-URL in IPP protocol, see section 3.2 in RFC 2566) is ipp://expp-proxy1.comnet.com/exppl%abc.com. Or the ExPM client 2-1 connects to the ExPM proxy 12 using IPP, and sends a printing command to the target printer.

[3] The ExPM server 31 on the intranet receives the printing instruction from the client 2-1 or the proxy 12, and connects to the ExPM proxy 12. A new connection is not made if one already exists. The protocol for connection has no particular restrictions (e.g. HTTP/FTP). Here HTTP is used as an example for description.

In the case of HTTP, the connection destination is "http://expp-proxy1.comnet.com/exppl%abc.com".

[4] The ExPM proxy 12, which is connected with the server 31, prepares the site page (spool) 14 of "exppl%abc.com". (A new site page is not created if one already exists.)

[5] The ExPM client 2-1 and the ExPM proxy 12 communicate by IPP.

[6] After connection between the ExPM server 31 and the ExPM proxy 12 is established, the ExPM server 31 starts transferring the status of the printer to the ExPM proxy 12. The ExPM proxy 12 notifies the status of the printer to the ExPM client 2-1 by IPP.

[7] The ExPM client 2-1 checks the status of the printer, and transfers the print job to the ExPM proxy 12 by IPP.

[8] In the same way, the ExPM proxy 12 converts the received job into HTTP, for example, and transfers it to the printer 31.

Repeating [6], [7] and [8], printing is performed while monitoring the status of the printer and the job (e.g. jam, printing progress). Also in addition to monitoring the status, the user can also control the printer and the job via the ExPM proxy 12 (e.g. printer ON/OFF line, job cancellation).

[9] After printing completes, the printer (ExPM server) 31 and the ExPM client 2-1 disconnect the session with the ExPM proxy 12, and the ExPM proxy 12 disconnects the session with the server 31 when disconnection of the "exppl%abc.com" site from all the clients is detected, and deletes the "exppl%abc.com" site.

In this way, printing out to the printer 31 on an intranet can be implemented from the client 2-1 on an extranet.

[Internet Printing Method]

The ExPP (Extranet Printing Protocol) protocol used for communication between the ExPM proxy and the ExPM server will now be described with reference to FIG. 6 to FIG. 12.

As the diagram depicting the format of the ExPP packet in FIG. 7 shows, this ExPP protocol extends the IPP packet by adding a tag for identifying the client to the IPP packet. For example, as FIG. 7 shows, the "Job Description Attributes" of the IPP packet 80 are extended, and the client attribute 81 of the "job-client-addr (client address) and "job-client-port (port number)" is added to specify the client. In FIG. 7, the field in the shaded portion is the extended part of ExPP.

Figure 6:
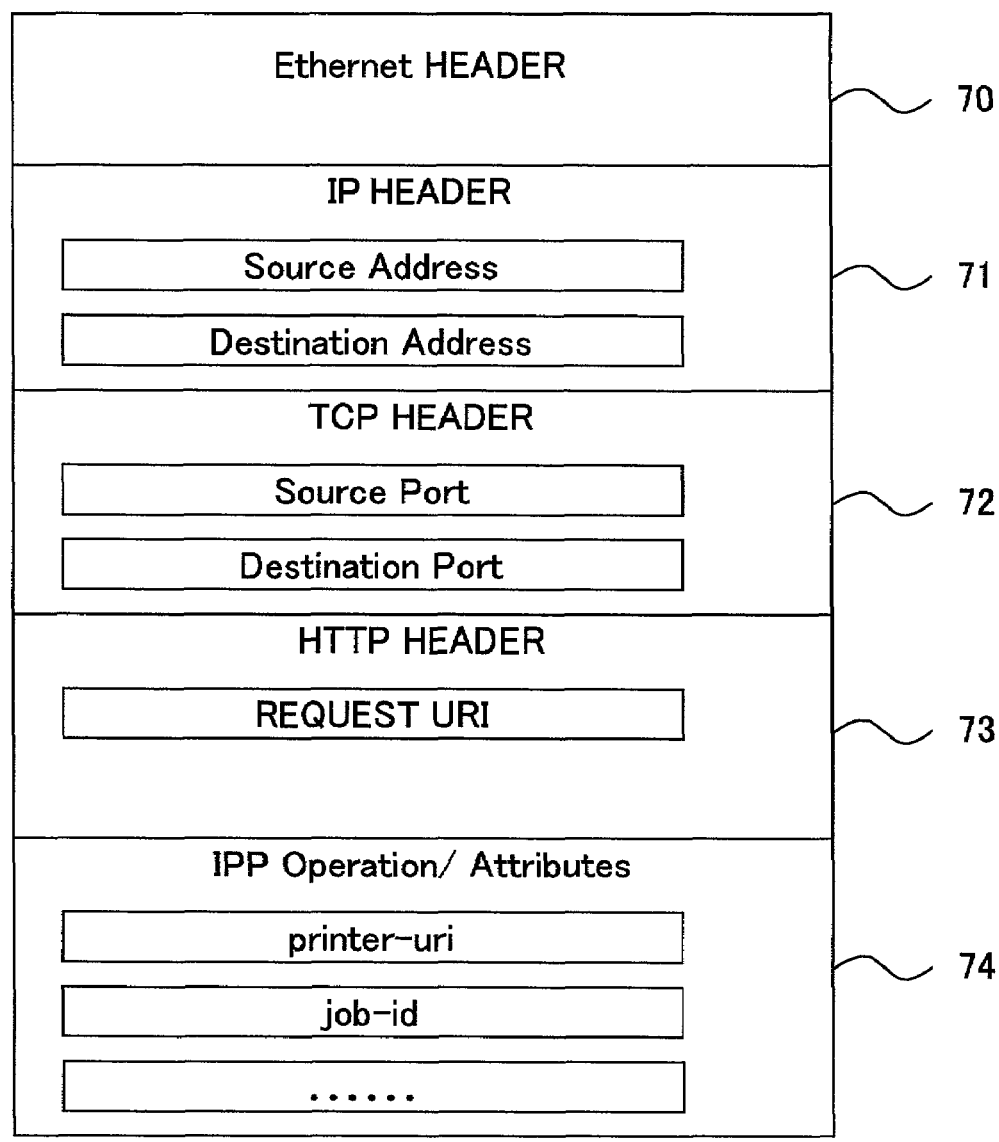
FIG. 6 is a diagram depicting the communication format between the client and the proxy unit in the system in FIG. 1.
Figure 9:
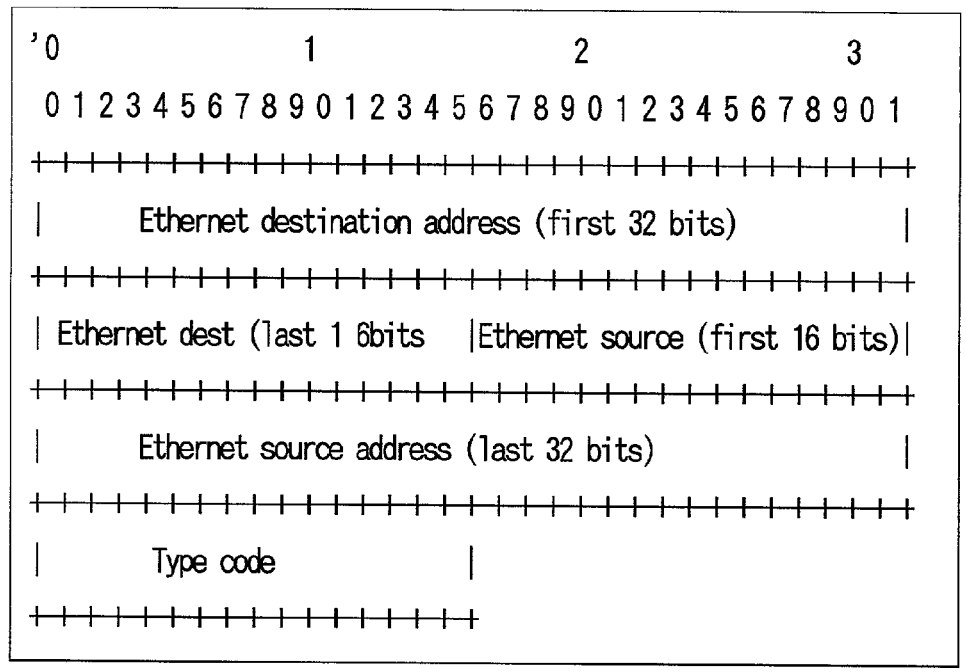
FIG. 9 is a format diagram of the Ethernet header of the communication format in FIG. 6.

This protocol performs communication which overlays such protocols as HTTP and FTP, as shown in FIG. 6. In other words, in the HTTP protocol, the communication packet (IPP packet) between the client and the proxy is comprised of the Ethernet header 70 (see FIG. 9), the IP header 71 (see FIG. 10), the TCP header 72 (see FIG. 11), the HTTP header 73 (see FIG. 12) and the IPP operation/attribute 74.

Figure 10:
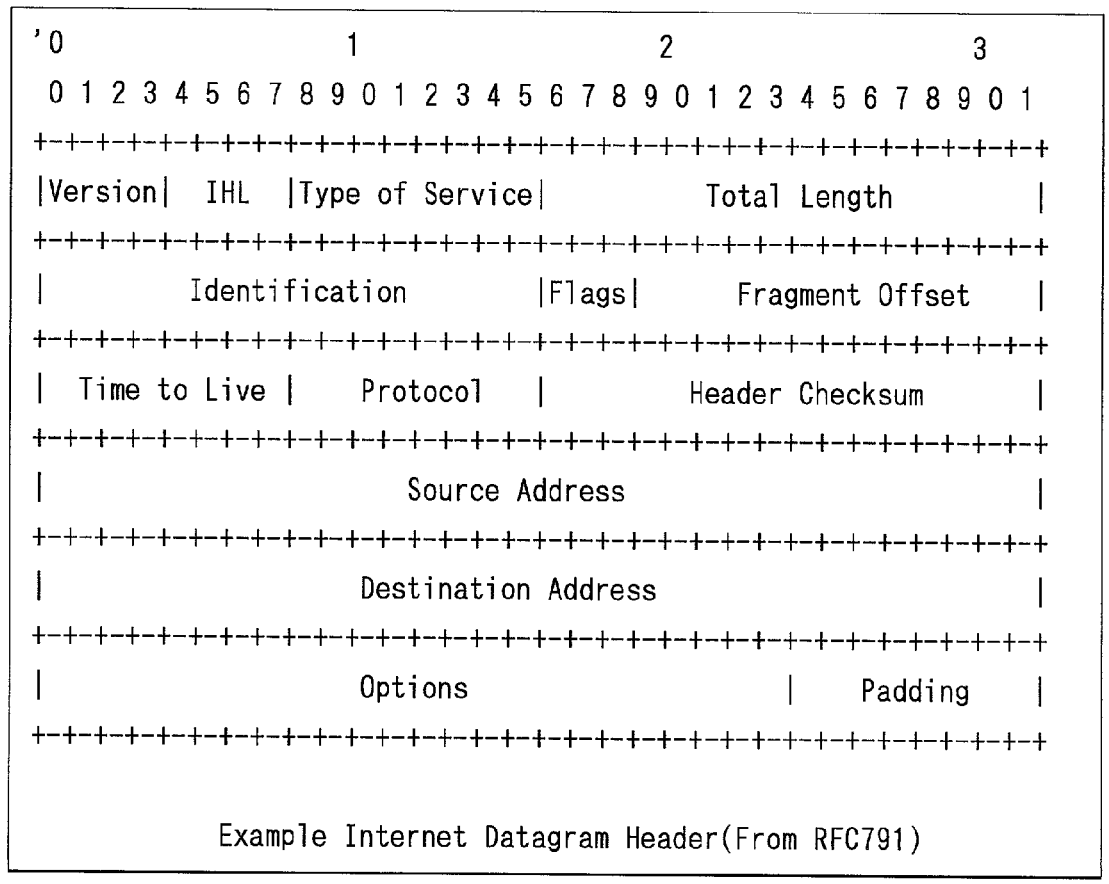
FIG. 10 is a format diagram of the IP header of the communication format in FIG. 6.
Figures 11, 12:
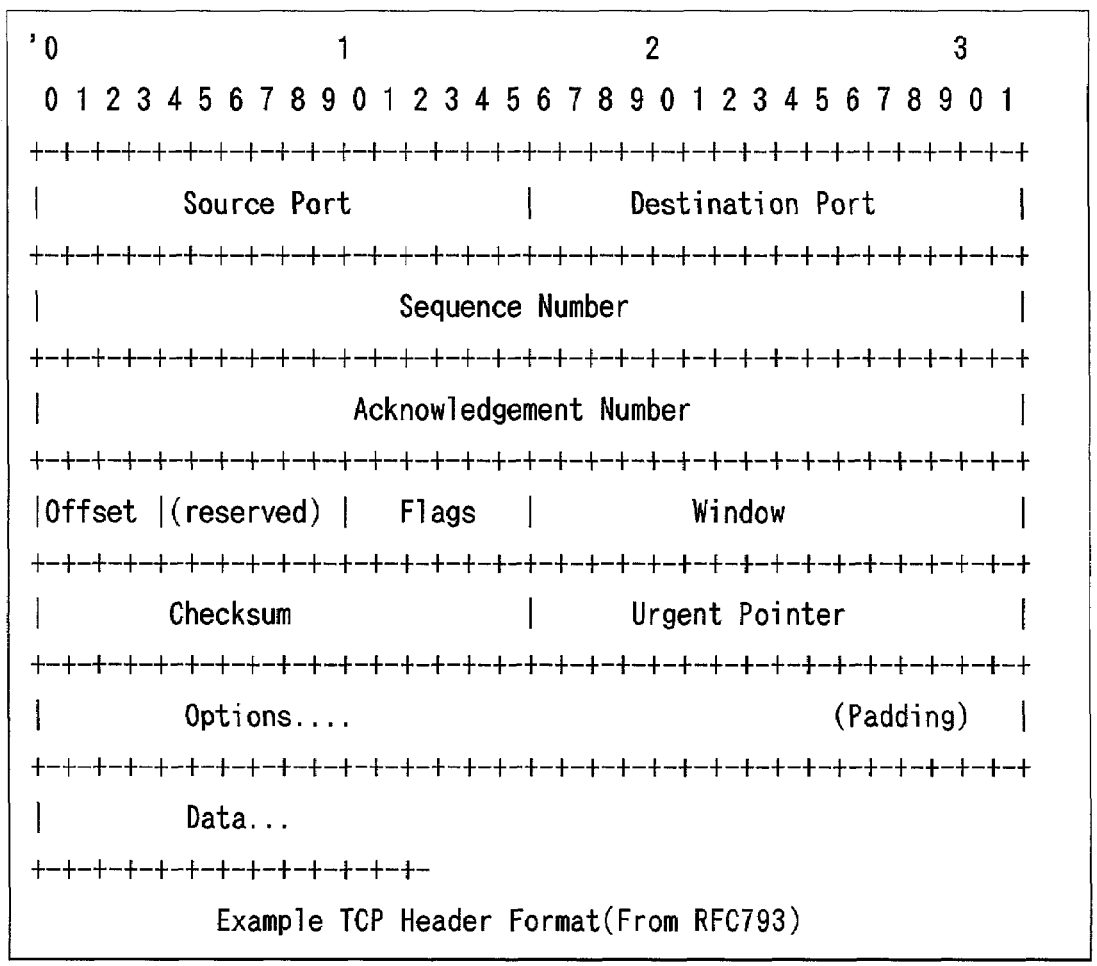
FIG. 11 is a format diagram of the TCP header of the communication format in FIG. 6.
FIG. 12 is a format diagram of the HTTP header of the communication format in FIG. 6.

The proxy 12 acquires the address of the transmission source (ExPM client) from the Source Address of the IP header in FIG. 10, and judges the port numbers of the transmission source (ExPM client) and transmission destination (ExPM proxy) from the Source Port and the Destination Port of the TCP (Transmission Control Protocol) header in FIG. 11. Also the site page (logical printer) can be specified by the request URL of the connection destination included in the request line of the HTTP header in FIG. 12.

Figures 13, 14:
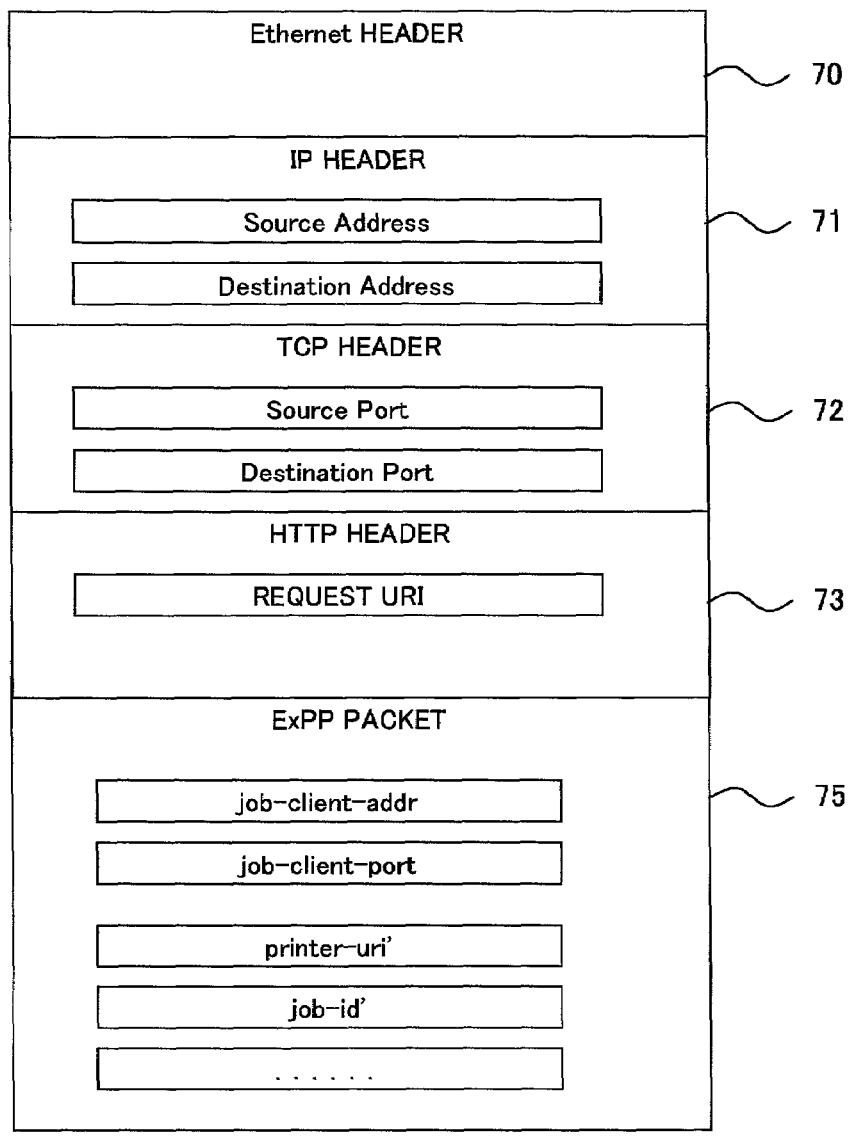
FIG. 13 is a diagram depicting the communication format between the proxy and the print server of the system in FIG. 1.
FIG. 14 is a table explaining the roles of the client, the proxy and the print server of the system in FIG. 1.

The proxy 12 converts the acquired data into the communication format in FIG. 13 and transmits it to the server 31. In other words, in HTTP protocol, the communication format is comprised of the Ethernet header 70 (see FIG. 9), the IP header 71 (see FIG. 10), the TCP header 72 (see FIG. 11), the HTTP header 73 (see FIG. 12), and the ExPP packet 75 as shown in FIG. 13, and this ExPP packet 75 is a packet where the "Job Description Attributes" of the IPP packet 80 have been extended, and the "job-client-addr/job-client-port" tag has been added, as shown in FIG. 7.

In this ExPP protocol example, a method to specify the client by "job-client-addr/job-client-port" is used to provide more information to the server 31. In TCP/IP, where information on the client can be acquired from the local port using the getpeername ( ) system call, the "job-proxy-socket (local socket number which is connected to the client)" can be used as a tag instead of "job-client-addr/job-client-port" tag.

Instead of the Job Description Attributes, a client identification attribute can be added to the other attribute groups of IPP. Also for a method of adding client identification information outside the IPP packet and packaging this information together with the IPP packet, as shown in FIG. 8, such a protocol as HTTP can also be used instead of adding an attribute to IPP.

The proxy 12 converts this communication format into the communication format in FIG. 13, and transmits it to the server 31. In other words, in HTTP format, the communication format is comprised of the Ethernet header 70 (see FIG. 9), the IP header 71 (see FIG. 10), the TCP header 72 (see FIG. 11), the HTTP header 73 (see FIG. 12), and the ExPP packet 75, as shown in FIG. 13, and this ExPP packet 75 is a packet where the "Job Description Attributes" of the IPP packet have been extended, and the ujob-client-addr/job-client-port" tag has been added.

The communication operation of ExPM will now be described with reference to FIG. 1. In FIG. 1, the packet that flows in the pipe 40 between the proxy 12 and the ExPM server 31 is an ExPP packet. For convenience of explanation, the client address and the port number are indicated as outside the IPP packet.

Figure 15:
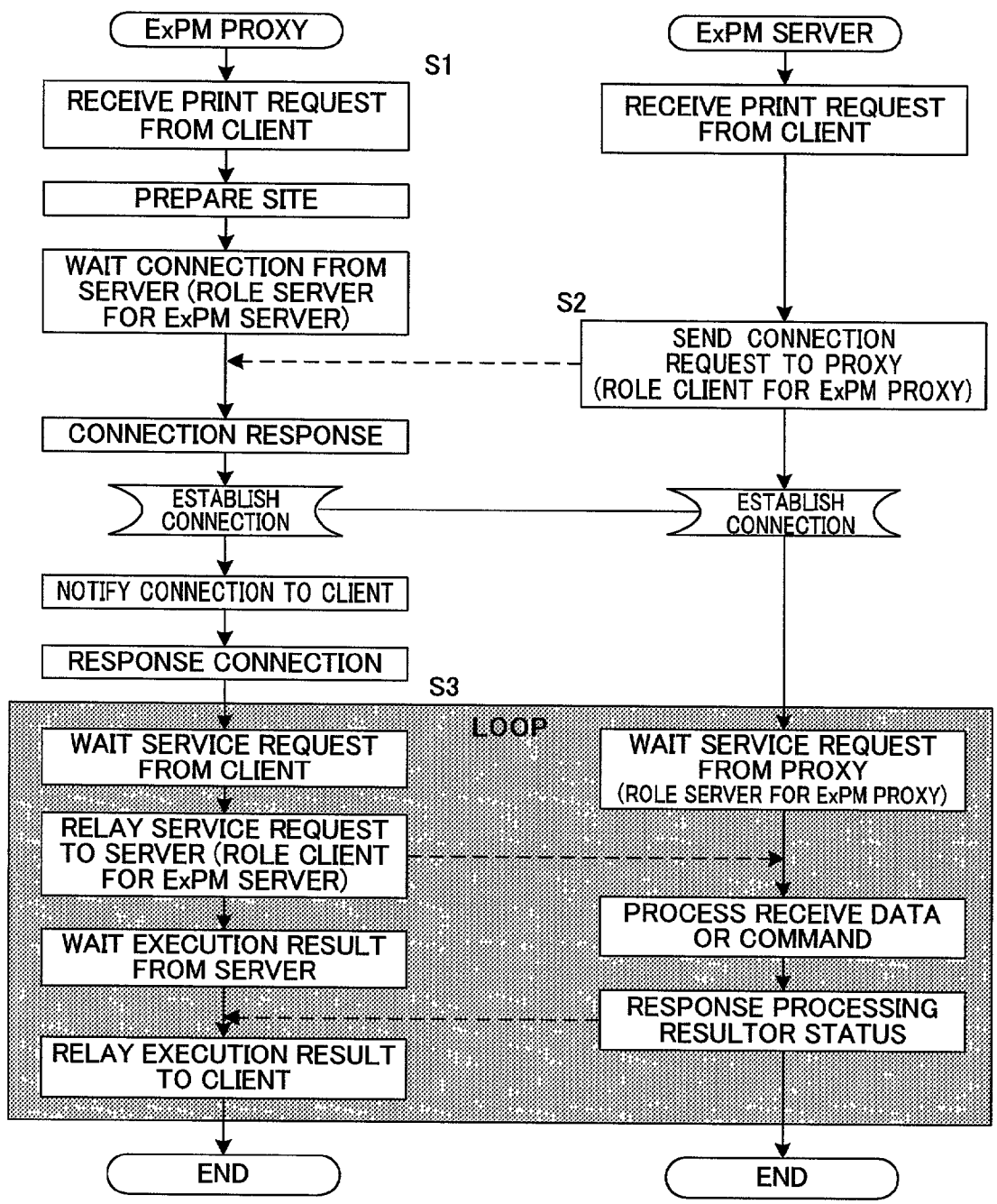
FIG. 15 is a connection processing flow chart of the proxy and the print server depicting role conversion in FIG. 14.

FIG. 14 is a table explaining the roles of the client, the proxy, and the server of the present invention, and FIG. 15 is a communication processing flow chart of ExPP. The communication processing of the ExPP proxy 12 and the ExPP server 31 will now be described with reference to FIG. 15.

(S1) The pipe 40 is established between the proxy 12 and the server 31. The timing to establish the pipe 40 is one of the following, which is described later.

a. After mail is transmitted from the client 2-1 to the server 31 (first embodiment), b. after mail is transmitted by the proxy 12 instead of by the client 2-1 to the server 31 (second embodiment), c. automatically connected when the server starts up (third embodiment).

In other words, the proxy 12 and the server 31 receive a printing request from the client 2-1 and the pipe 40 is established, and at the same time, the proxy 12 creates the server site 14 of the ExPM server 31 connected by the pipe 40. By this, the proxy 12 enters the state of waiting reception from the server 31. At this time, this server site 14 appears to be one IPP print server from the client 2-1 point of view. The client 2-1 is a normal IPP client, and the client 2-1 and the proxy 12 are connected by a normal IPP connection.

(S2) When a TCP connection is established between the ExPM proxy 12 and the ExPM server 31, the firewall 30 can be circumvented by issuing a connection request from the ExPM server 31. At this connection, the ExPM server 31 plays the role of a client, and the proxy 12 plays the role of a server.

(S3) Once the pipe 40 is established, the proxy 12 relays the service request from the client 2-1 to the ExPM server 31. At this time, the previous roles are reversed, where the proxy 12 now plays the role of a client, and the ExPM server 31 plays the role of a server. FIG. 14 shows this change of roles. In other words, the roles do not change between the client and the proxy, but between the proxy and the ExPM server, where the roles change at connection and during service.

(S4) The server 31 processes the received data and commands, and returns the processing result or the status to the proxy 12. The proxy 12 relays the processing result to the client 2-1. This process is repeated.

By issuing a connection request from the ExPM server 31 in this way, the firewall 30 can be circumvented so as to connect the inside of the firewall 30 to the outside.

Also in the ExPM proxy 12, the above mentioned encoder 18 of the exchanger 16 in FIG. 4 converts the IPP packet received from the client 2-1 into an ExPP packet (job-client-addr/job-client-port is added), and transfers the ExPP packet to the server 31.

In the ExPM packet that was returned from the server 31 to the ExPM proxy 12, on the other hand, client identification information (job-client-addr/job-client-port) enters as is. The decoder 19 of the ExPM proxy 12 extracts the "client IP address" and the "port number" to specify the link with the client 2-1, and returns a response to the client 2-1 by using IPP.

In this way, the proxy 12 performs protocol conversion between IPP and ExPP. Therefore the client 2-1 can control the printing of the printer 31 by IPP circumventing the firewall 30.

[First Embodiment]

Figure 16:
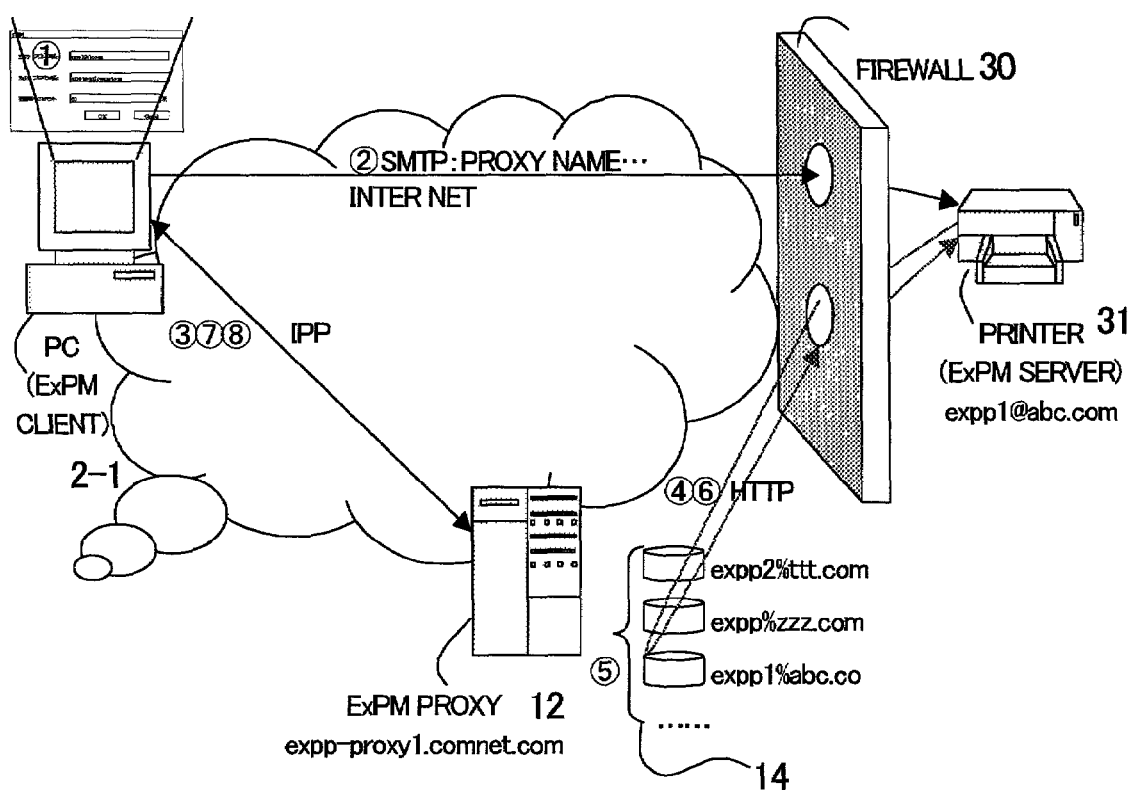
FIG. 16 is a diagram depicting an External Printing Model (ExPM) of the first embodiment of the present invention.
Figure 17:
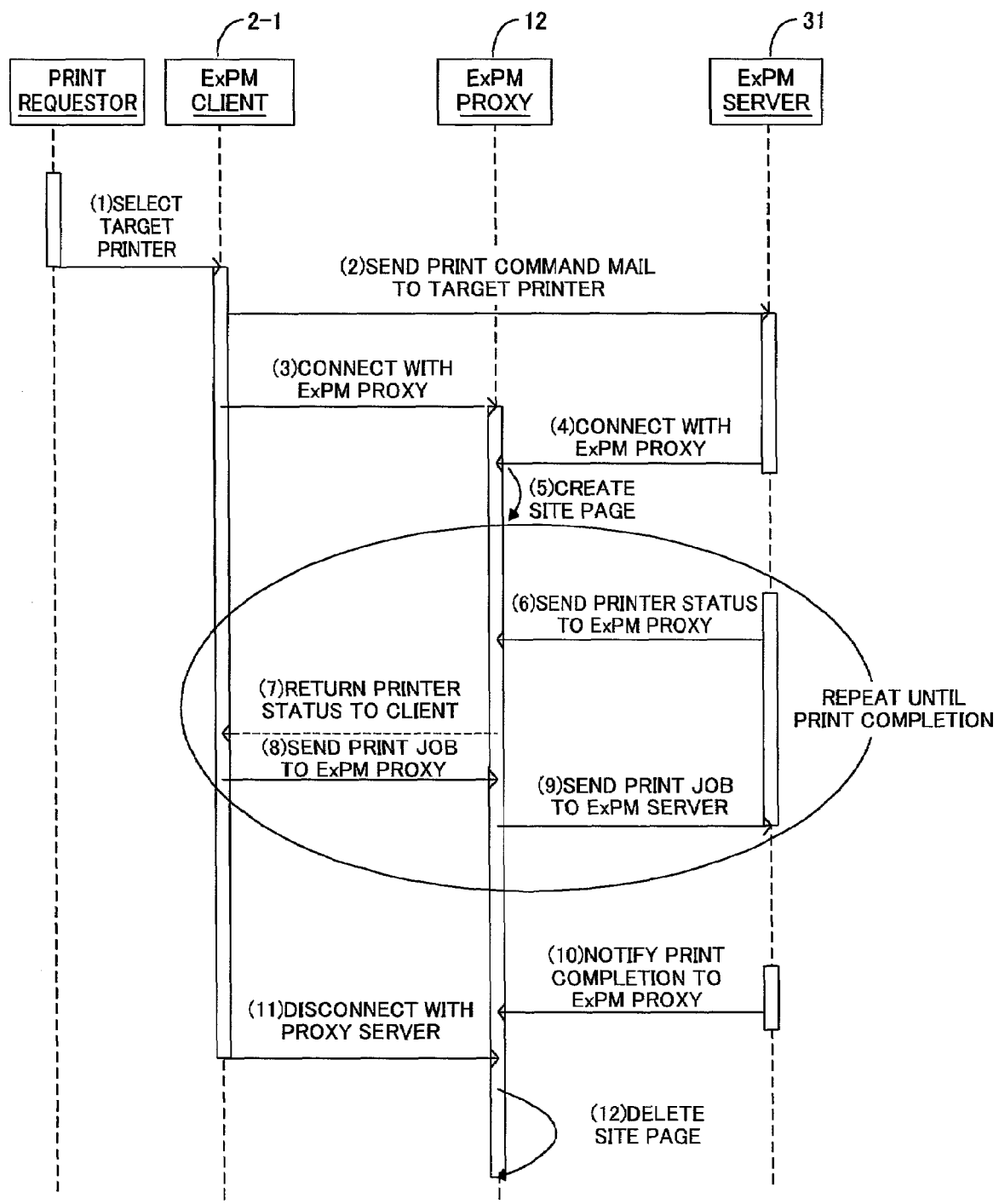
FIG. 17 is a time chart of the ExPM in FIG. 16.

FIG. 16 is a diagram depicting the ExPM of the first embodiment of the present invention, and FIG. 17 is a time chart thereof. This embodiment is an example of a model (basic model) where the SMTP client is installed on the ExPM client 2-1.

In this example, the printer (print server) 31 has its own mail account instead of a URL. The mail account is unique and known to the public on the Internet, so the station 2-1 of the extranet can specify the printer 31 using a private IP.

As described above, when "HYPERLINK 'mailto:exppl@abc.com' exppl@abc.com" is the public name of the printer 31 on the intranet, the printer (ExPM server) 31 on the intranet appears to be a normal IPP server using the ExPM proxy server 12. In other words, the server site "exppl.%abc.com" is started in the spool 14. This address mapping method is specified as follows.

Proxy server URL+ExPM server account (@ is converted to %)

In this case, the address mapping method is specified by "exppproxyl.comnet.com/exppl%abc.com".

The printing flow will now be described with reference to FIG. 16 and FIG. 17.

[1] The user selects a printer to be used for printing. In other words, the ExPM client 2-1 specifies the printing target printer. As FIG. 3 shows, the ExPM server name and the ExPM proxy name are specified on the screen of the ExPM client 2-1.

[2] The ExPM client 2-1 sends a printing command mail to the target printer 31 "HYPERLINK 'mailto:exppl@abc.com' exppl@abc.com" using SMTP (Simple Mail Transfer Protocol). Mail includes the content of the ExPM proxy name.

[3] The ExPM client 2-1 connects to the ExPM proxy 12 using IPP. The connected URL (referred to as the printer-uri in IPP protocol, see section 3.2 of RFC 2566) is "ipp://exppproxyl.comnet.com/exppl%abc.com".

[4] The ExPM server 31 on the intranet receives the printing command mail from the client 2-1, and connects to the ExPM proxy 12. A new connection is not performed if one already exists. The protocol for connection has no particular restrictions (e.g. HTTP/FTP). Here HTTP is used as an example for description. In the case of HTTP, the connection destination is "HYPERLINK 'http://exppproxyl.comnet.com/exppl%abc.com' http://exppproxy1.comnet.com/exppl%abc.com".

[5] The ExPM proxy 12, which is connected with the server 31, prepares the site page (spool) 14 of "exppl%abc.com". (A new site page is not created if one already exists.)

[6] After connection between the ExPM server 31 and the ExPM proxy 12 is established, the ExPM server starts transferring the status of the printer 31 to the ExPM proxy 12.

[7] The ExPM proxy 12 notifies the status of the printer to the ExPM client 2-1 by IPP.

[8] The ExPM client 2-1 checks the status of the printer 31 and transfers the print job to the ExPM proxy 12 by IPP.

[9] In the same way, the ExPM proxy 12 converts the received job into a protocol which can circumvent the firewall 30 (e.g. HTTP), and transfers it to the printer 31.

Repeating [6], [7], [8] and [9], printing is performed while monitoring the status of the printer and the job (e.g. jam, printing progress). In addition to status monitoring, the user can also control the printer and the job via the ExPM proxy 12 (e.g. printer ON/OFF line, job cancellation).

[10] After printing completes, the printer 31 and the ExPM client 2-1 disconnects the session with the ExPM proxy 12, and the ExPM proxy 12 disconnects the session with the server 31 when disconnection with the "exppl%abc.com" site from all the clients is detected, and deletes the "exppl%abc.com" site.

In this way, a print out to the printer 31 on an intranet can be implemented from the client 2-1 on an extranet.

Figure 18:
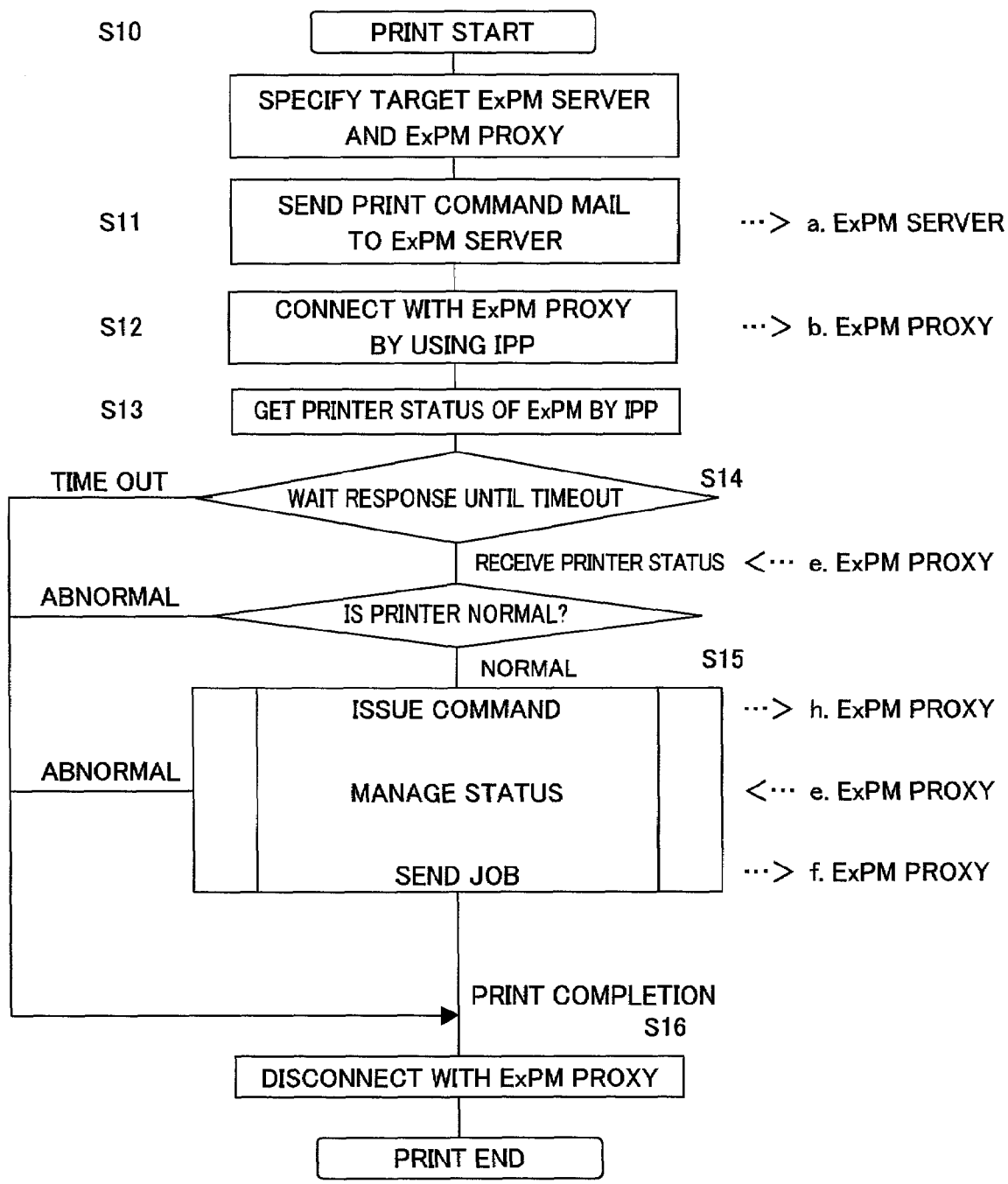
FIG. 18 is a processing flow chart of the ExPM client of the first embodiment in FIG. 16.

FIG. 18 is a processing flow chart of the client for the above mentioned printing processing.

(S10) As FIG. 3 shows, the user specifies the ExPM server name and the ExPM proxy name on the screen of the ExPM client 2-1.

(S11) The ExPM client 2-1 sends a printing command mail to the target printer 31 "HYPERLINK 'mailto:exppl@abc.com' exppl@abc.com" using SMTP (Simple Mail Transfer Protocol). Mail includes the content of the ExPM proxy name.

(S12) The ExPM client 2-1 connects to the ExPM proxy 12 using IPP. The connected URL (referred to as the printer-uri in IPP protocol, see section 3.2 of RFC 2566) is "ipp://expp-proxyl.comnet.com/exppl%abc.com".

(S13) The ExPM client 2-1 gets the status of the printer 31 acquired with the ExPM proxy 12 by IPP.

(S14) The ExPM client 2-1 checks the status of the printer 31. In other words, the ExPM client 2-1 judges whether the printer status is received before time out, and advances to step S16 if time out occurs. When the printer status is received before time out, the ExPM client 2-1 judges whether the printer is normal based on the received content, and advances to step S16 if abnormal.

(S15) When the printer 31 is normal, the ExPM client 2-1 transfers the command and the print job to the ExPM proxy 12 by IPP. Also, the ExPM client 2-1 issues the print job while monitoring the status of the printer and the job (e.g. jam, printing progress) from the proxy 12.

(S16) After printing completes, the ExPM client 2-1 disconnects the session with the ExPM proxy 12, and completes print processing.

Figure 19:
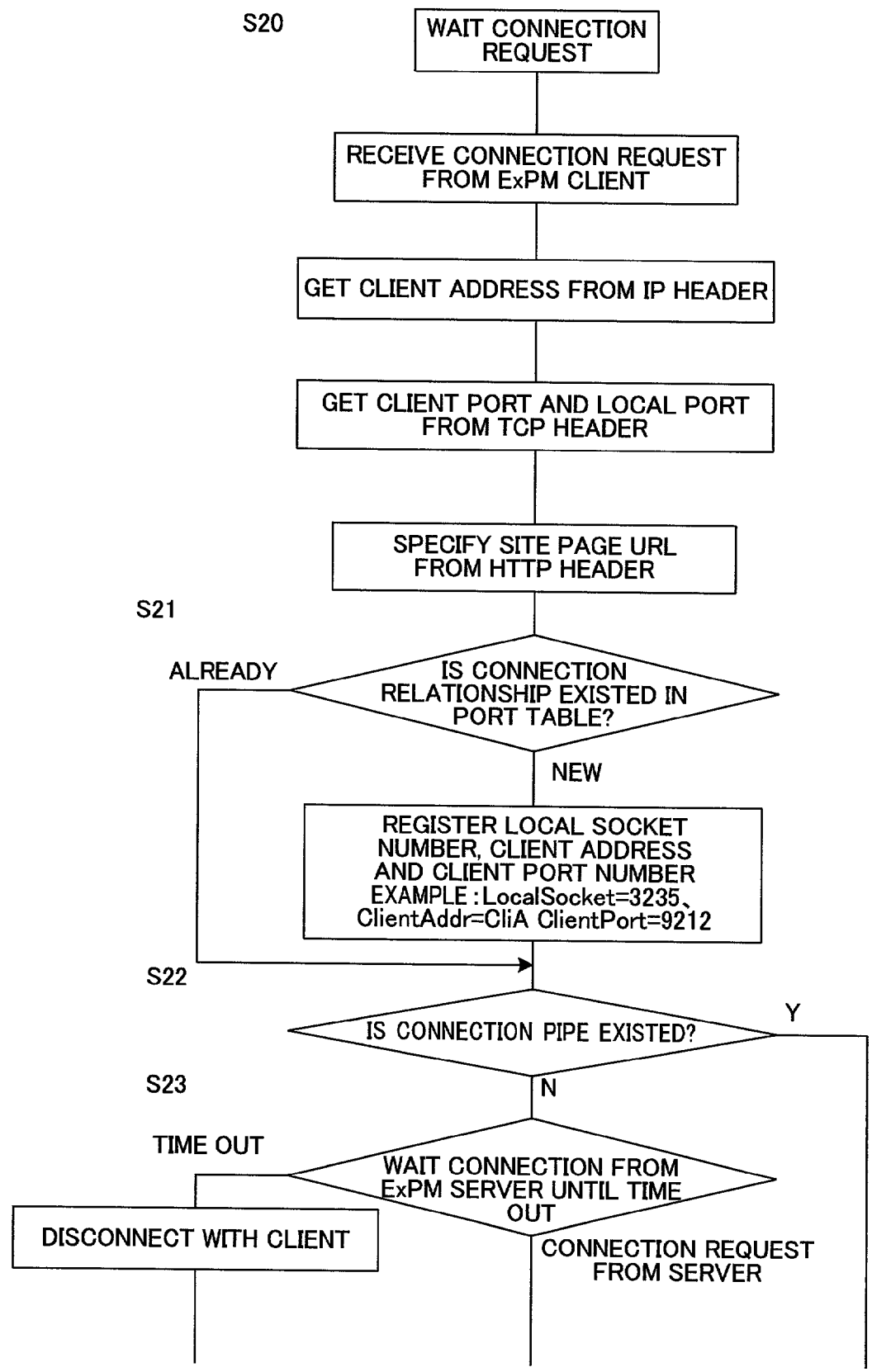
FIG. 19 is a processing flow chart (1) of the ExPM proxy of the first embodiment in FIG. 16.
Figure 20:
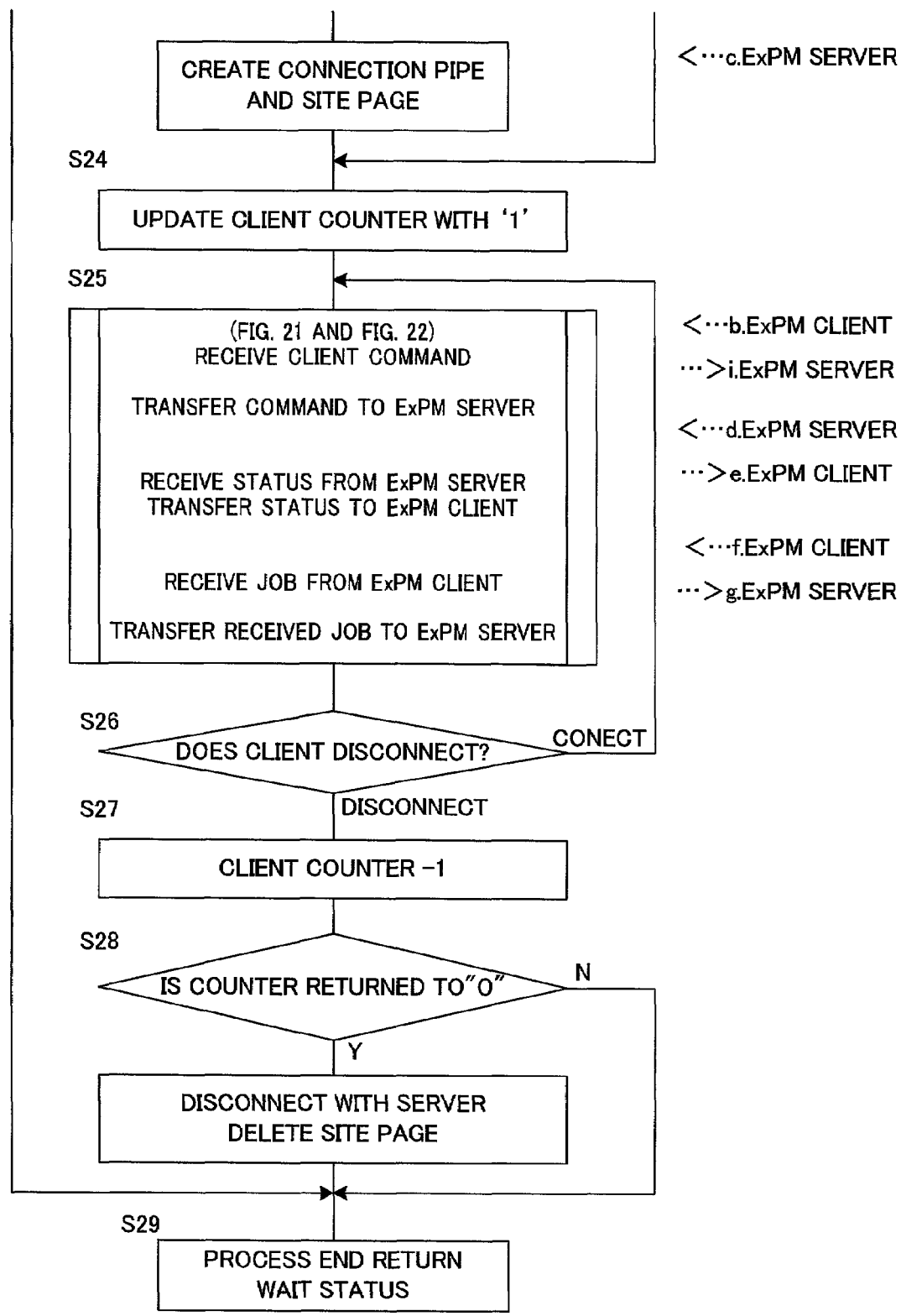
FIG. 20 is a processing flow chart (2) of the ExPM proxy of the first embodiment in FIG. 16.

The print processing of the proxy 12 will now be described with reference to FIG. 19 and FIG. 20.

(S20) When the proxy 12 receives a connection request (see FIG. 6) from the ExPM client 2-1 in connection request wait status, the proxy 12 acquires the client address from the IP header and acquires the client port and the local port from the TCP header. Also, the proxy 12 specifies the site page URL from the HTTP header.

(S21) The proxy 12 judges whether the correspondence relationship of this connection is registered in the port correspondence table. When registered, the proxy 12 advances to step S22. When not registered, the proxy 12 registers the local socket number, the client address, and the client port number to the port correspondence table. In this way, the client 2-1 is connected to the ExPM proxy 12.

(S22) Then the proxy 12 judges whether the connection pipe 40 with the ExPM server 31 already exists. When the connection pipe 40 already exists, the proxy 12 advances to step S24.

(S23) When the connection pipe 40 does not exist, the proxy 12 waits for a connection request from the ExPM server 31 until time out. When time out occurs, the proxy 12 notifies this to the client 2-1, disconnects the session with the client 2-1, and advances to step S29. When a connection request is received from the server 31 before time out, the proxy 12 creates the connection pipe 40 with the ExPM server 31, and creates a site page.

(S24) The proxy 12 increments the client counter of this site page "+1".

(S25) After the connection between the ExPM server 31 and the ExPM proxy 12 has established, the proxy 12 receives the command of the client 2-1, transfers the command to the ExPM server 31, receives the status of the ExPM server 31, and then notifies the printer status to the ExPM client 2-1 by IPP. Also, the proxy 12 receives the job of the client 2-1, and transfers the job to the ExPM server 31.

Figure 21:
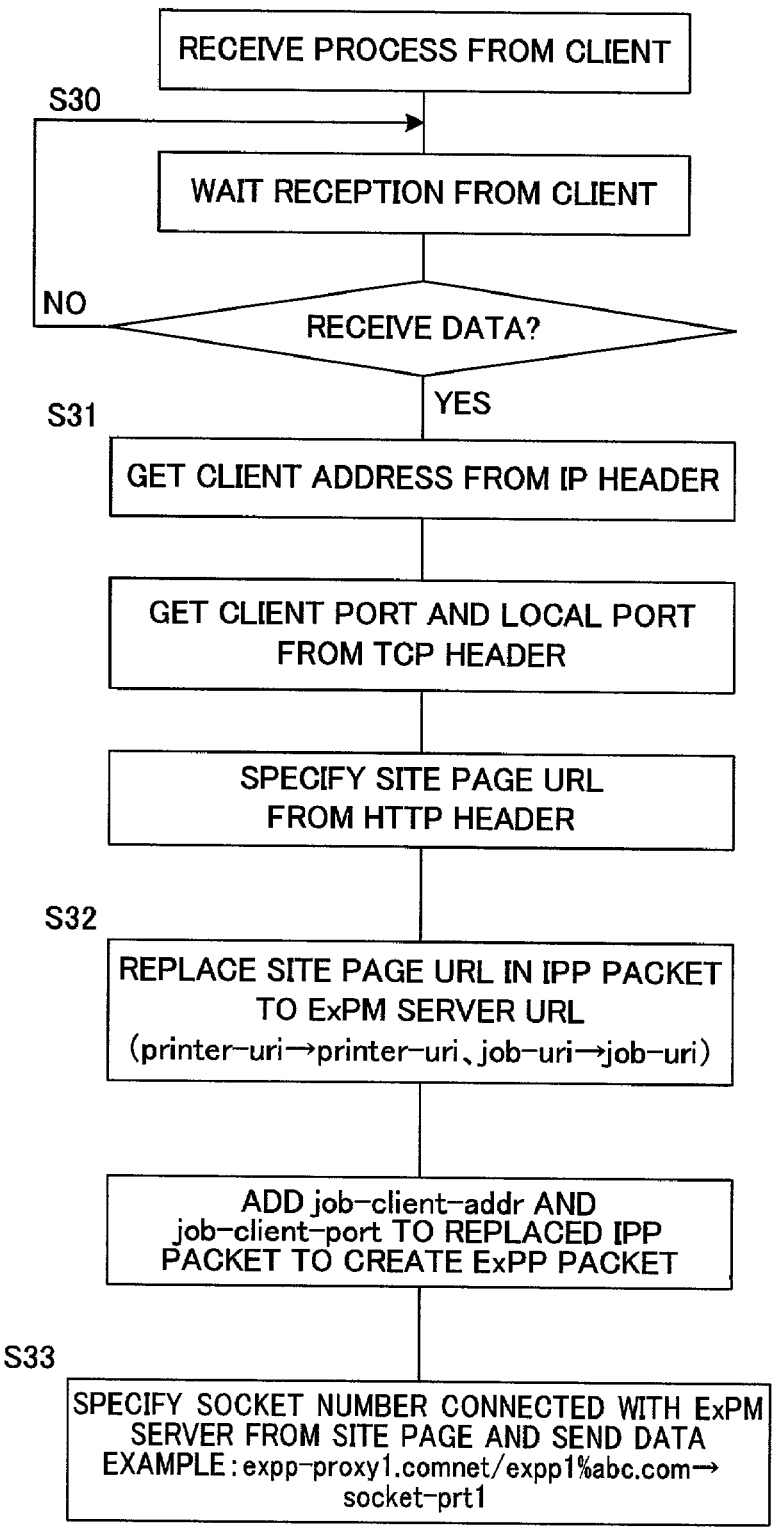
FIG. 21 is a reception processing flow chart of the proxy from the client in FIG. 20.
Figure 22:
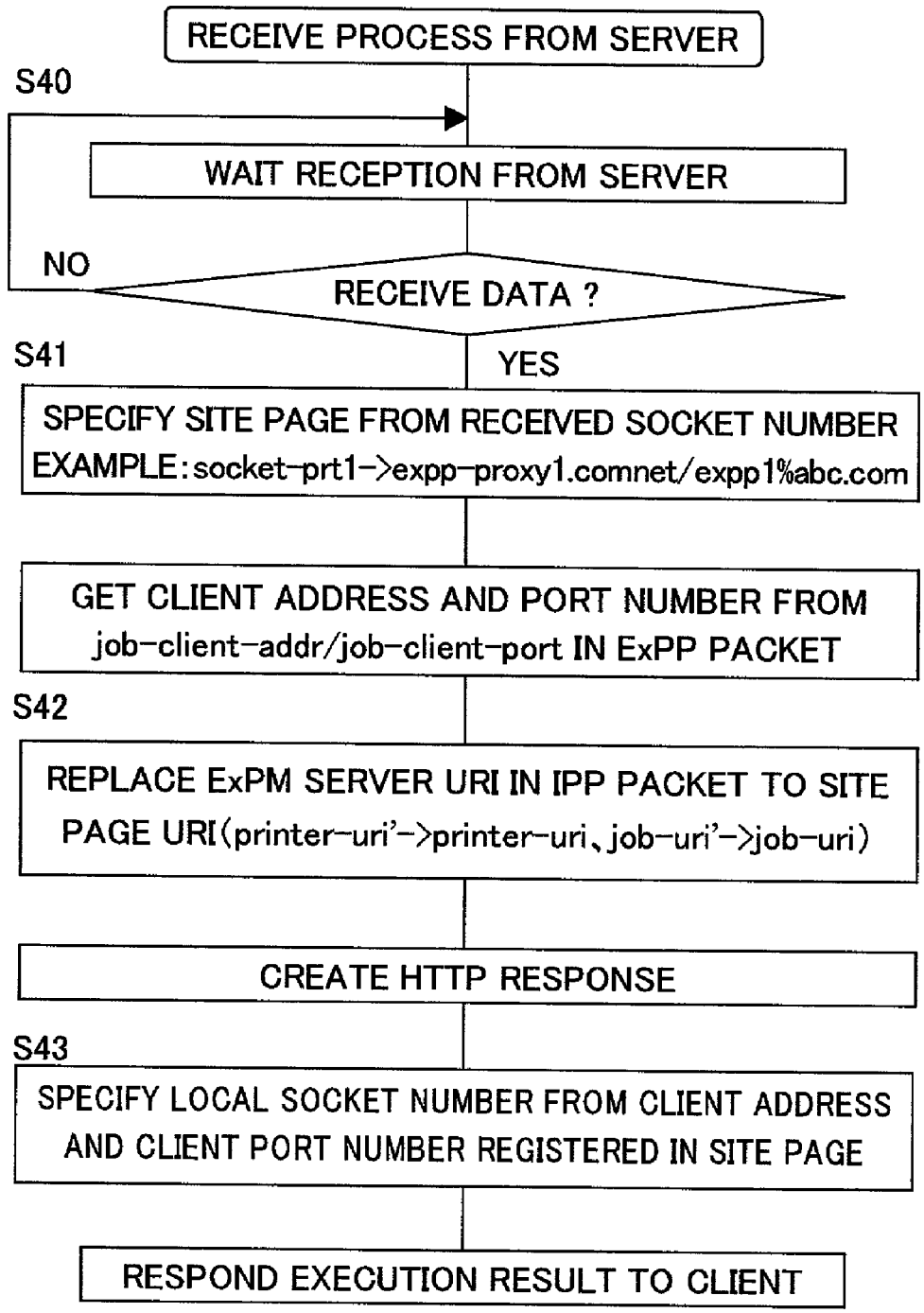
FIG. 22 is a reception processing flow chart of the proxy from the print server in FIG. 20.

This transfer processing will be described later with reference to FIG. 21 and FIG. 22.

(S26) After printing completes, the ExPM client 2-1 disconnects the session with the ExPM proxy 12, so the proxy 12 judges whether the client disconnected the session, and returns to step S25 if not disconnected.

(S27) When the client disconnects the session, the proxy 12 decrements the client counter "−1".

(S28) The proxy 12 judges whether the client counter returned to "0", and checks whether the session with this server site is disconnected from all the clients. When the client counter did not return to "0", the proxy 12 advances to step S29. When the client counter returned to "0", the proxy 12 disconnects the session with the server 31, and deletes the site page.

(S29) The proxy 12 completes processing and returns to wait status.

The reception processing from the client in Step S25 will now be described with reference to FIG. 21.

(S30) The proxy 12 waits for reception from the client.

(S31) When data from the client is received, the proxy 12 acquires the client address from the IP header, and acquires the client port and the local port from the TCP header. Also, the proxy 12 specifies the site page URL from the HTTP header.

(S32) The proxy 12 replaces the site page URL of the IPP packet with the ExPM server URL, adds "job-client-addr" and "job-client-port" to the IPP packet after replacement to create an ExPP packet.

(S33) The proxy 12 specifies a socket number connected with the ExPM server 31 from the site page, and sends data.

Reception processing from the server in step S25 will now be described with reference to FIG. 22.

(S40) The proxy 12 waits for reception from the server 31.

(S41) When data from the server is received, the proxy 12 specifies the site page from the reception socket number, and acquires the client address and the client port number from "job-client-addr" and "job-client-port" of the ExPP packet.

(S42) The proxy 12 replaces the ExPM server URL of the IPP packet with the site page URL so as to create the HTTP response.

(S43) The proxy 12 specifies the local socket number from the client address and the client port number recorded in the site page, and returns the execution result to the client.

Figure 23:
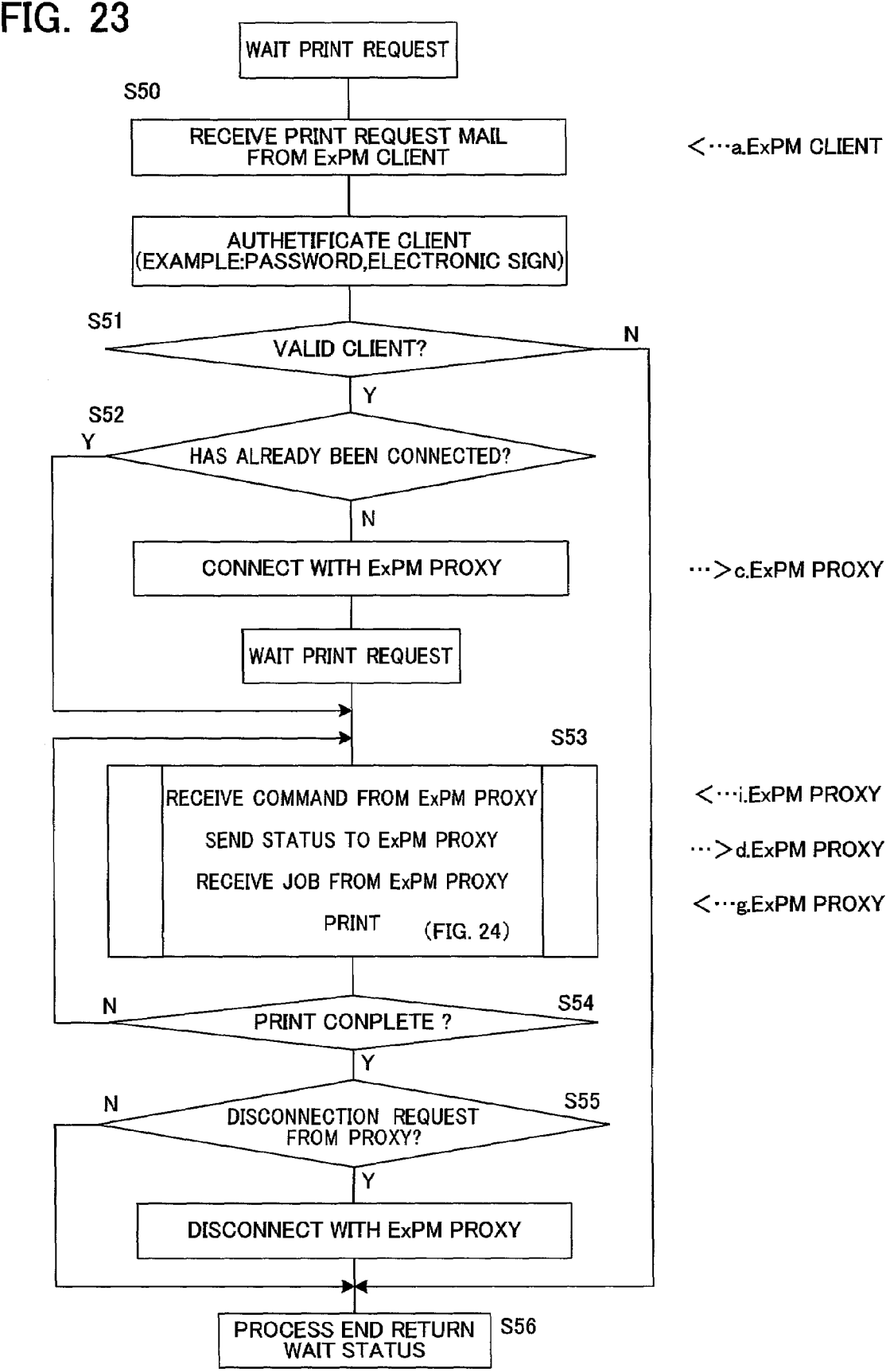
FIG. 23 is a processing flow chart of the ExPM print server of the first embodiment in FIG. 16.
Figure 24:
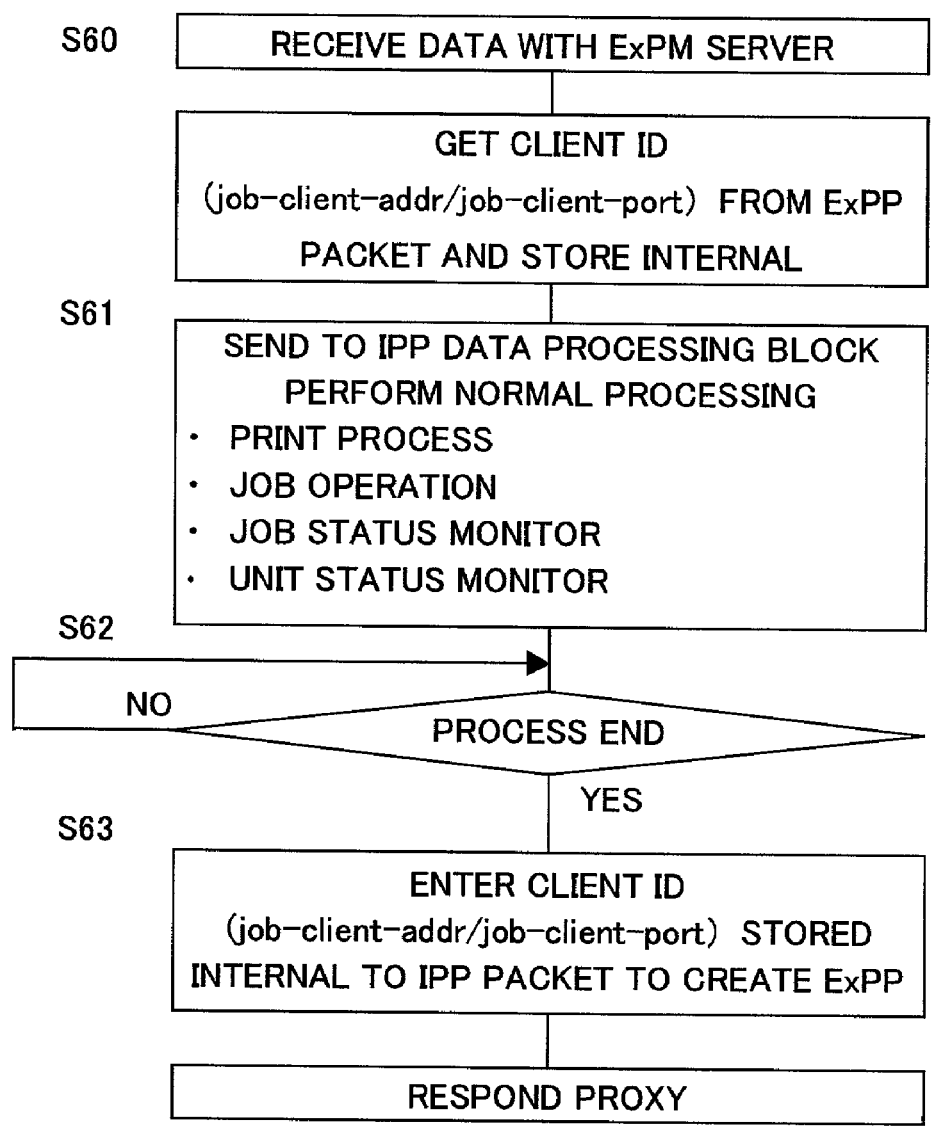
FIG. 24 is a data reception processing flow chart of the ExPM server in FIG. 23.

Print processing of the print server 31 will now be described with reference to FIG. 23 and FIG. 24.

(S50) When the print server 31 receives a printing command mail from the ExPM client 2-1 in printing request wait status, the print server 31 authenticates the client. For this authentication, a known authentication method, such as password and electronic signature, can be used.

(S51) When the authentication result judges the client as invalid, the print server 31 advances to step S56.

(S52) When the print server 31 judges the client as valid, the print server 31 judges whether the print server 31 has already been connected with the specified proxy. When already connected, the print server 31 advances to step S53. When not connected, the print server 31 connects with the ExPM proxy 12.

(S53) After connection between the ExPM server 31 and the ExPM proxy 12 is established, the print server 31 receives a command from the ExPM proxy 12, sends the status of the ExPM server 31 to the ExPM proxy 12, receives the job from the ExPM proxy 12, and prints this job. This printing processing will be described later with reference to FIG. 24.

(S54) The print server 31 judges whether printing completed, and returns to step S53 if printing is not completed.

(S55) When printing is completed, the print server 31 judges whether a disconnection request was received from the ExPM proxy 12, and advances to step S56 when a disconnection request was not received. When a disconnection request was received, the print server 31 disconnects the session with the ExPM proxy 12.

(S56) The print server 31 completes processing and returns to wait status.

The reception processing from the proxy 12 in step S53 will now be described with reference to FIG. 24.

(S60) When the print server 31 receives data from the proxy 12, the print server 31 acquires the client identification information (job-client-addr and job-client-port) from the ExPP packet and stores it internally.

(S61) The print server 31 transfers the data to the IPP data processing block (see FIG. 5) of the ExPP processing block 34, and executes the instructed processing (print processing, job operation, job status monitoring, unit status monitoring).

(S62) The print server 31 waits for the completion of the instructed processing.

(S63) When processing completes, the print server 31 includes the internally stored client identification information (job-client-addr and job-client-port) in the IPP packet to be returned so as to create an ExPP packet, and returns the response to the proxy 12.

The connection method between the proxy 12 and the print server 31 will now be described using HTTP as an example.

(a) No Blocking System (Regular Polling)

In this method, the ExPM server 31 polls the site page at a predetermined interval once the ExPM server 31 receives the printing request notice (first embodiment: from the client, second embodiment: from the proxy), and data, if any, is received and processed. To transfer the status data to the client, the ExPM server 31 connects with the site page again and sends the data.

(b) Blocking System (Immediate Reaction)

Figure 25:
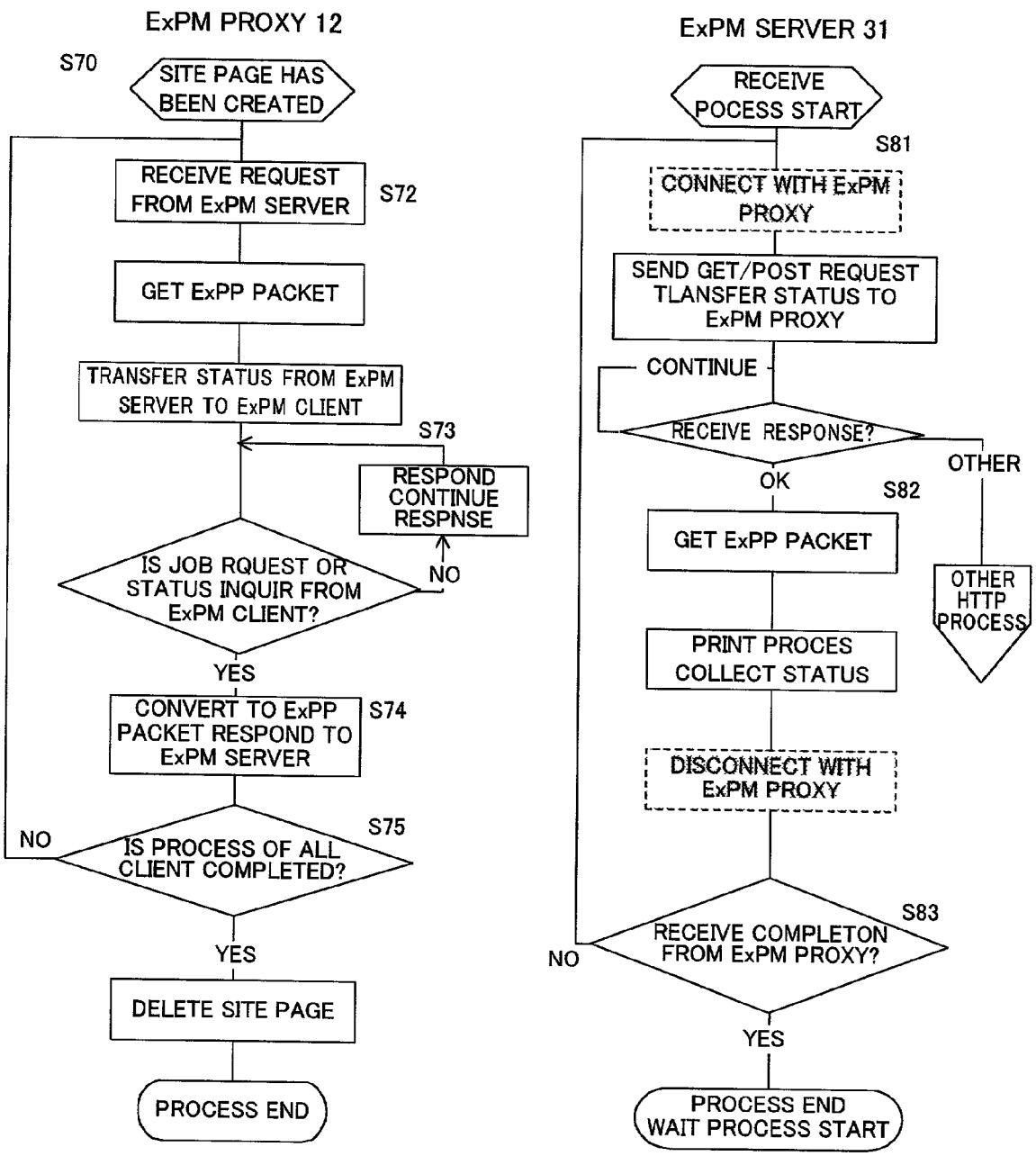
FIG. 25 is a connection processing flow chart of the proxy and the print server in FIG. 16.

FIG. 25 is a processing flow chart of the blocking system between the proxy 12 and the server 31.

After the client 2-1 connects with the proxy 12, the proxy 12 generates the sight page (S70). When the ExPM server 31 receives the printing request notice (first embodiment: from the client, second embodiment: from the proxy), the ExPM server 31 issues the POST (or GET) request of HTTP to the proxy, and requests the content of the site page of the proxy (S81).

When the proxy 12 receives the request from the ExPM server 31, the proxy 12 acquires the ExPP packet, and transfers the status information from the ExPM server 31 to the ExPM client 2-1 (S72). Then the proxy 12 checks whether a job request or a status inquiry was received from the ExPM client, and if not received from any client, the ExPM proxy 12 simply returns a CONTINUE response to continue the connection (S73).

When a job request or status inquiry was received from a client, the proxy 12 returns a response to the ExPM server 31 (S74). The ExPM server 31 receives the data and collects the printing processing and the status data (S82). When a completion notice is not received from the proxy 12, the ExPM server 31 issues the POST (GET) request, and enters data wait status again (S83). When printing requests from all the clients are processed, the proxy 12 notifies this completion to the ExPM server, and deletes the site page (S75).

Figure 26:
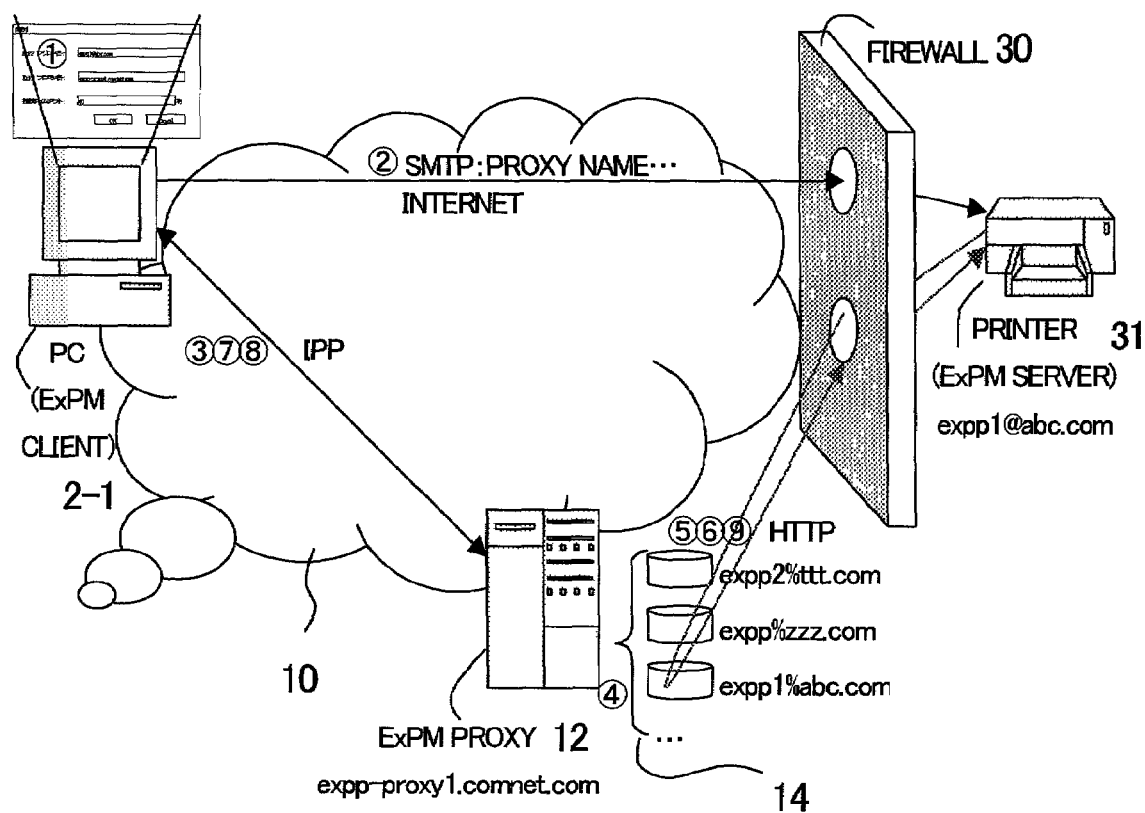
FIG. 26 is a diagram depicting a variant form of the ExPM of the first embodiment of the present invention.
Figure 27:
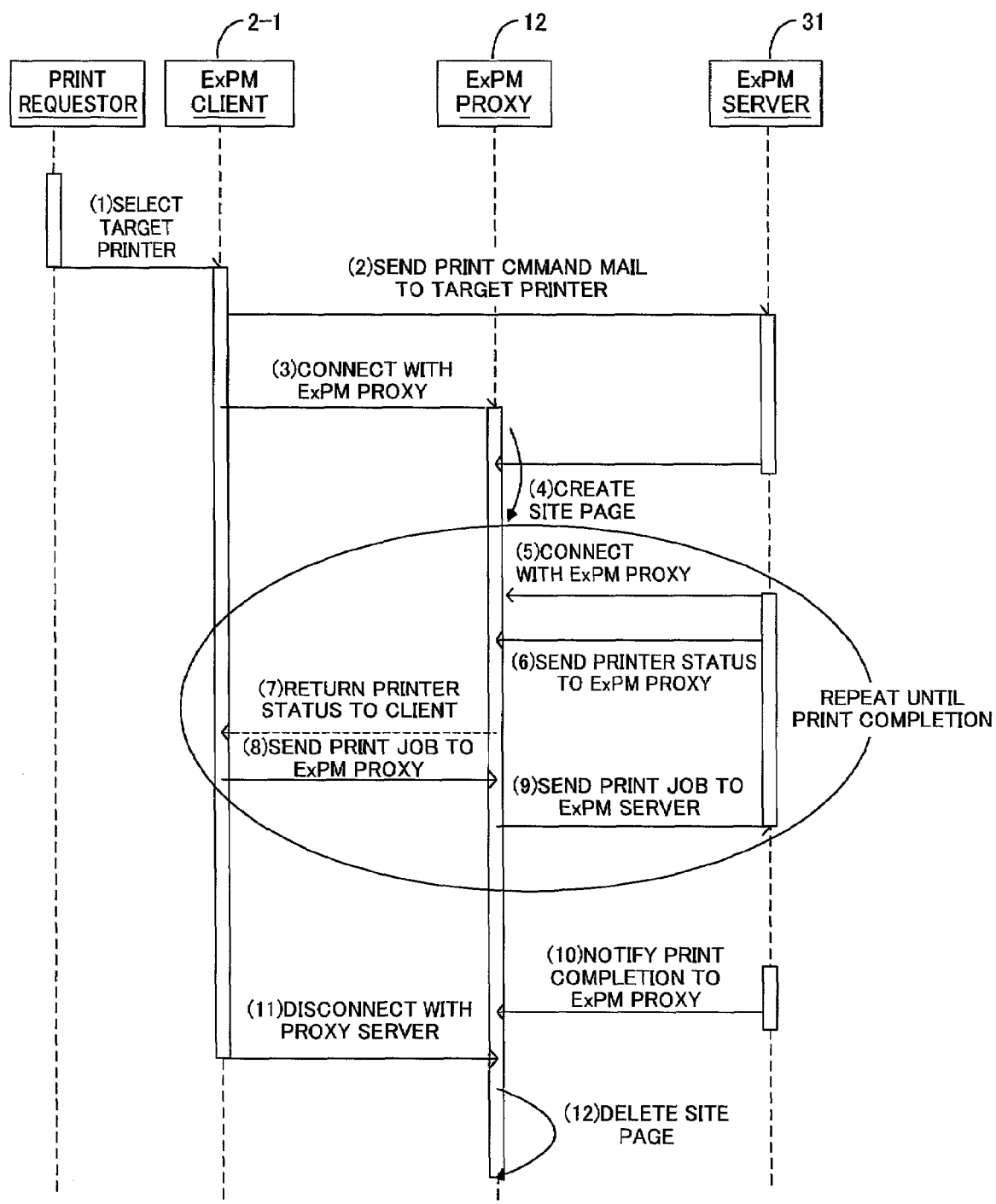
FIG. 27 is a time chart of the ExPM in FIG. 27.

FIG. 26 is a diagram depicting a variant form of the first embodiment of the present invention, and FIG. 27 is a timing chart thereof. In this variant form, the steps [4] and [5] execution sequence is changed, and there are no other changes in a first embodiment in FIG. 16.

[Second Embodiment]

Figure 28:
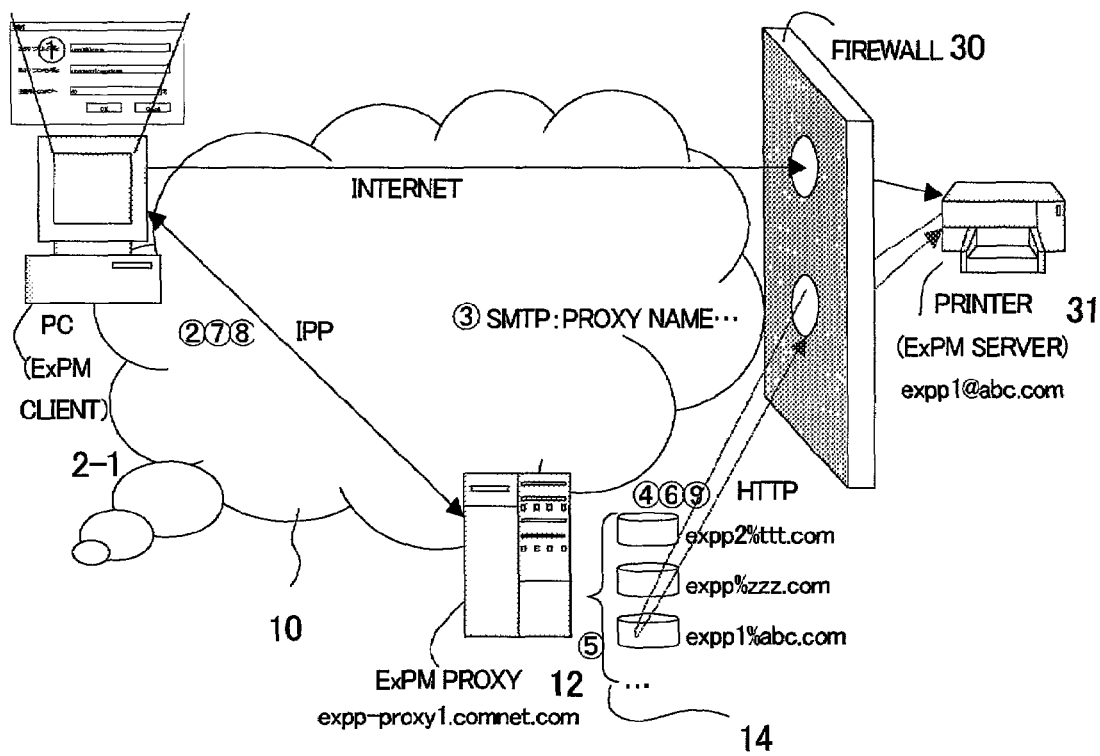
FIG. 28 is a diagram depicting the ExPM of the second embodiment of the present invention.
Figure 29:
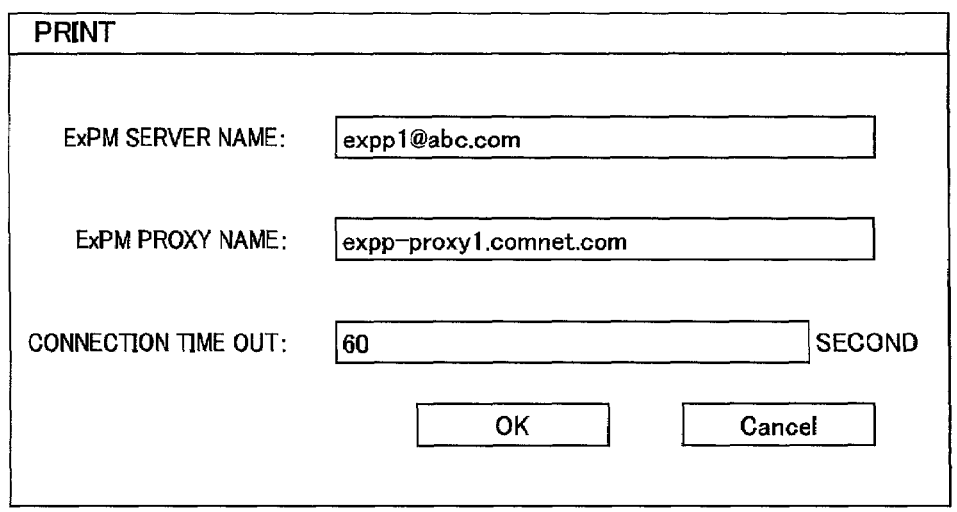
FIG. 29 is a diagram depicting the printing setup screen in FIG. 28.
Figure 30:
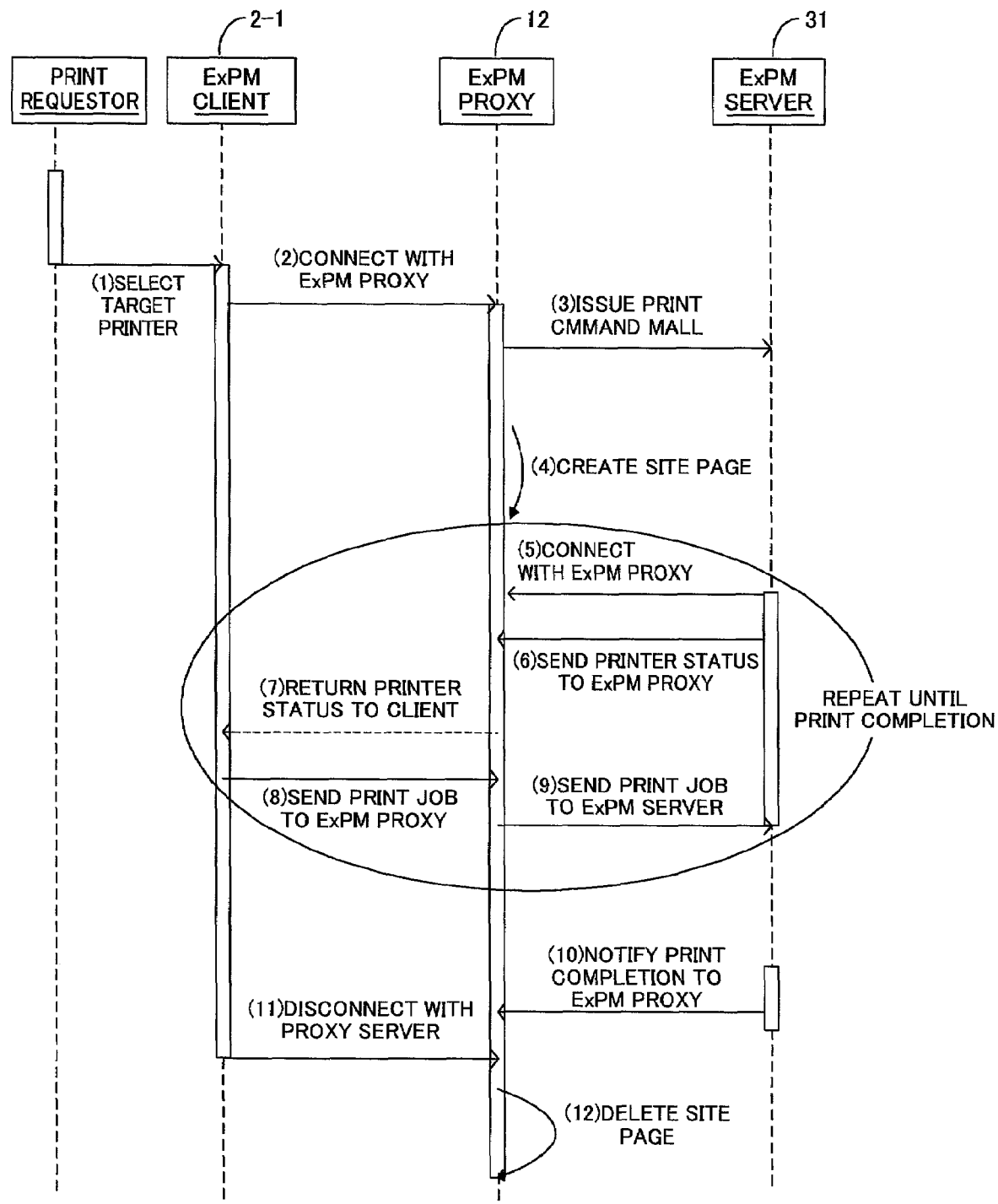
FIG. 30 is a time chart of the ExPM in FIG. 28.

FIG. 28 is a diagram depicting the ExPM of the second embodiment of the present invention, FIG. 29 is a printer specification screen thereof, and FIG. 30 is a time chart thereof. This example is a model where the SMTP client is installed on the ExPM proxy 12 (extension model 1).

As FIG. 28 shows, the difference between this extension model 1 and the basic model in FIG. 16 is that the SMTP client is not the ExPM client 2-1, but the ExPM proxy 12 is a transmission source of SMTP. Compared with the basic model in FIG. 16, the merits are as follows.

(1) An SMTP client is not needed for the ExPM client 2-1. A client can easily be installed.

(2) The ExPM client 2-1 and the ExPM proxy 12 are connected only by a pure IPP, so the standard IPP client can be used as the ExPM client 2-1, and development of an ExPM client is unnecessary. Development of the proxy alone is sufficient.

The demerit is that the ExPM proxy 12 must support SMTP, and installing authentication functions is complex.

Authentication functions can easily be implemented in the case of the basic model in FIG. 16 if the client and the server agree on the authentication method to be used, since printing command mail is directly sent to the ExPM server 31. In the case of the extension model, on the other hand, the proxy 12 relays the command, so the authentication method must be determined between the client and the proxy and between the proxy and the server respectively.

In other words, after the proxy decodes the authentication request by the authentication rule with the client, data is encrypted by the authentication rule with the server, and is sent. So, client information, that should be known by only the server, will be known to a third party proxy, and the degree of security drops. Also if the proxy that is installed in the public area is attacked by a hacker, the information of the client will be leaked to questionable individuals.

The flow of printing processing will now be described with reference to FIG. 28 to FIG. 30.

[1] The user selects a printer to be used for printing. In other words, the ExPM client 2-1 specifies the printing target printer. As FIG. 29 shows, the ExPM server name and the ExPM proxy name are specified on the screen of the ExPM client 2-1.

[2] The ExPM client 2-1 connects to the ExPM proxy 12 using IPP. The connection URL is "ipp://expp-proxyl.comnet.com/exppl%abc.com".

[3] The ExPM proxy 12 sends the printing command mail to the target printer exppl@abc.com using SMTP.

[4] The ExPM server 31 on the intranet receives the printing command mail from the ExPM proxy 12, and connects to the ExPM proxy 12. A new connection is not made if one already exists. Protocol for connection has no particular restrictions (e.g. HTTP/FTP). Here HTTP is used as an example for description.

In the case of HTTP, the connection destination is http://expp-proxyl.comnet.com/exppl%abc.com.

[5] The ExPM proxy 12, which is connected with the server 31, prepares the site page (spool) 14 of "exppl%abc.com". (A new site page is not created if one already exists).

[6] After connection between the ExPM server 31 and the ExPM proxy 12 is established, the ExPM server 31 starts transferring the status of the printer 31 to the ExPM proxy 12.

[7] The ExPM proxy 12 notifies the status of the printer to the ExPM client 2-1 by IPP.

[8] The ExPM client 2-1 checks the status of the printer, and transfers the print job to the ExPM proxy 12 by IPP.

[9] In the same way, the ExPM proxy 12 converts the received job into a protocol which can circumvent the firewall (e.g. HTTP), and transfers it to the printer 31.

[10] After printing completes, the printer 31 and the ExPM client 2-1 disconnect the session with the ExPM proxy 12, and the ExPM proxy 12 disconnects the session with the server 31 when the disconnection with the exppl@abc.com site from all the clients is detected, and deletes the "exppl%abc.com" site.

In this way, print out to a printer on an intranet can be implemented from a client on an extranet.

Figure 31:
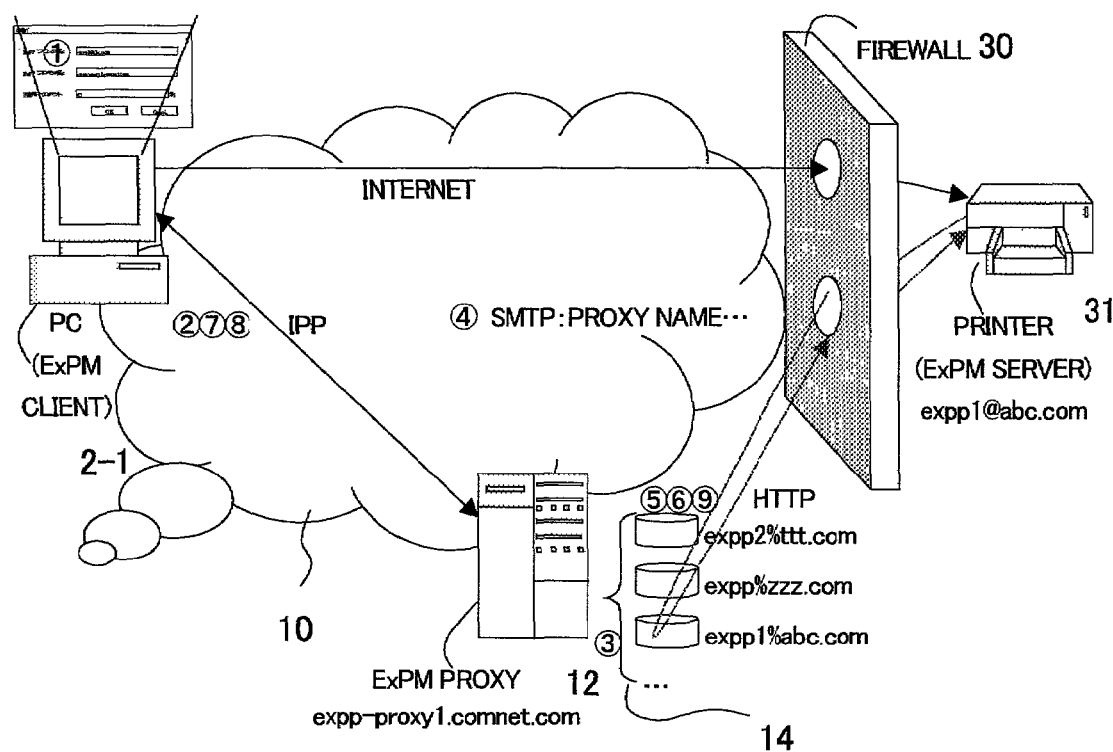
FIG. 31 is a diagram depicting a variant form of the ExPM of the second embodiment of the present invention.
Figure 32:
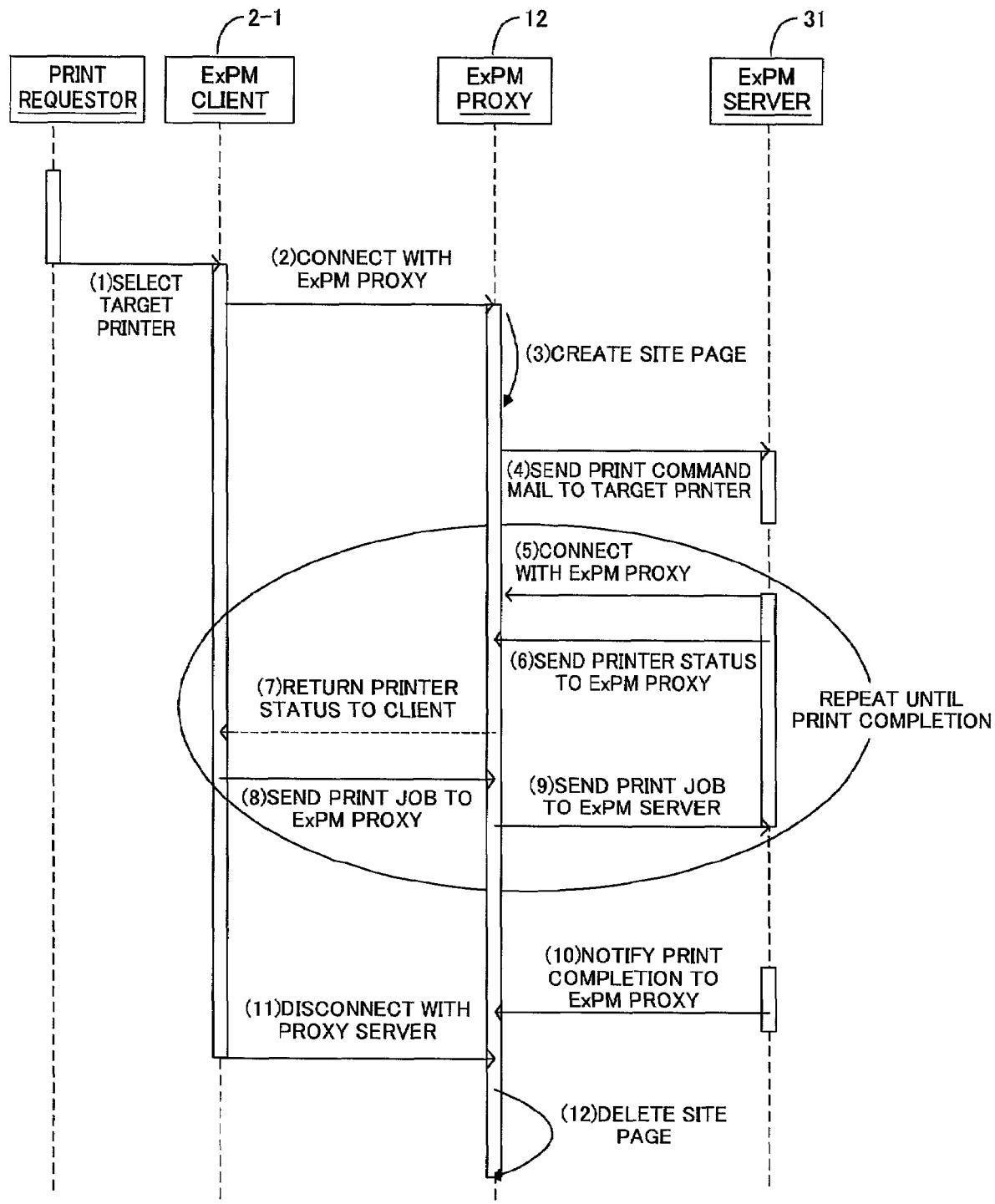
FIG. 32 is a time chart of the ExPM in FIG. 31.

FIG. 31 is a diagram depicting a variant form of the second embodiment of the present invention, and FIG. 32 is a time chart thereof. In this variant form, the [3], [4] and [5] sequence is changed, and there are no other changes in a second embodiment in FIG. 28.

[Third Embodiment]

Figure 33:
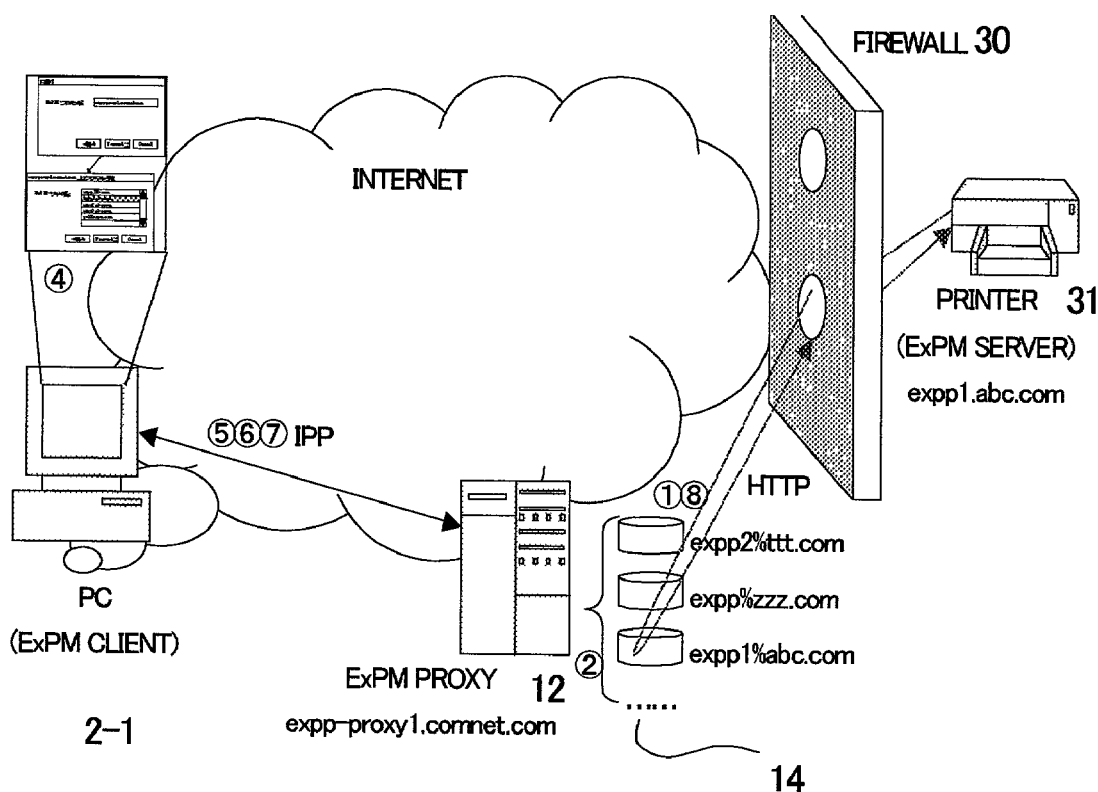
FIG. 33 is a diagram depicting the ExPM in the third embodiment of the present invention.
Figure 34:
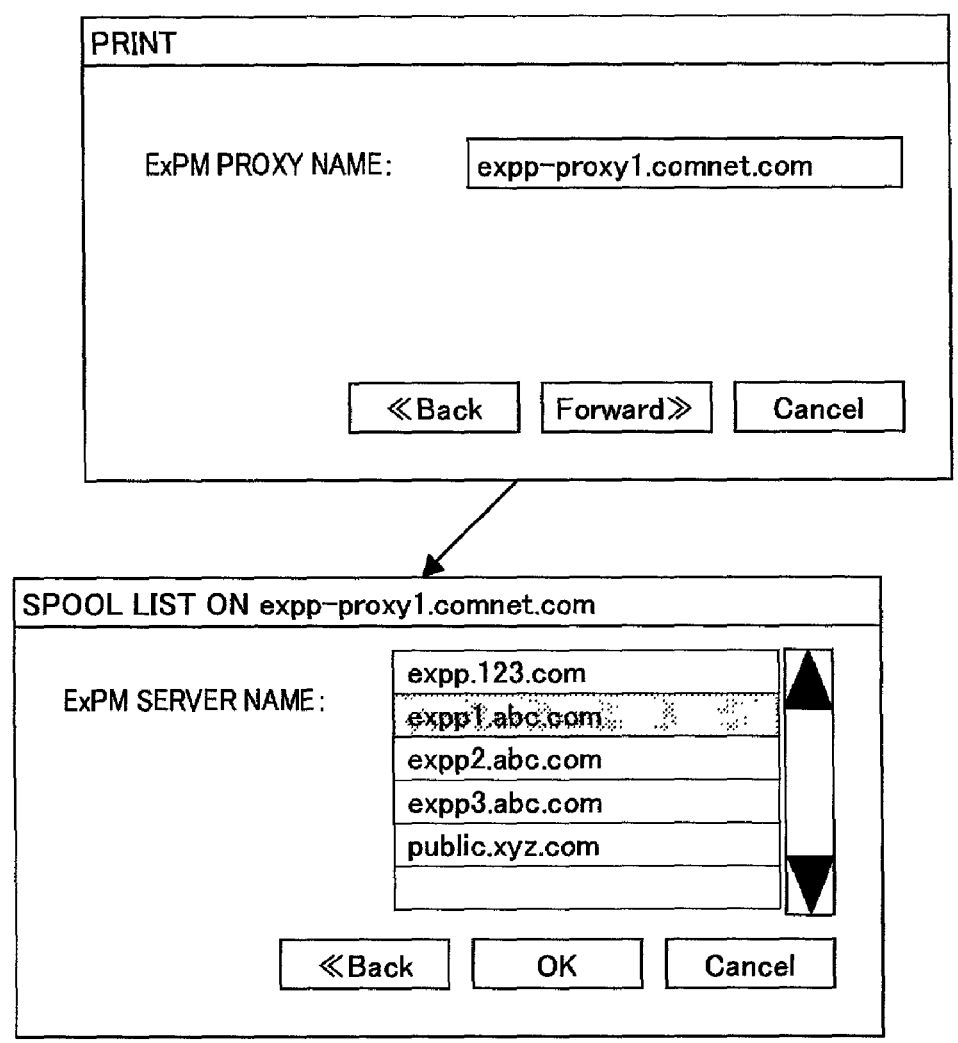
FIG. 34 is a diagram depicting the printing setup screen in FIG. 33.

FIG. 33 is a diagram depicting the ExPM of the third embodiment of the present invention, and FIG. 34 is a diagram depicting a printing setup screen thereof. In the embodiment of FIG. 33, the ExPM model (called the extension model 2) is a model for implementing printing which circumvents the firewall in an environment where electronic mail is not equipped.

In this model, the TCP connection, which constantly connects the ExPM server 31 and the ExPM proxy 12, is provided in order to make the electronic mail function unnecessary and to simplify the configuration. In other words, the ExPM client 2-1 and the ExPM proxy 12 need not install an SMTP client, an SMTP server outside the firewall for transmitting mail is unnecessary, the ExPM server 31 need not install a mail reception client, such as POP3/IMAP, the mail server inside the firewall need not be used, and a mail account need not be assigned to the ExPM server 31.

In this system, the name for identifying a printer can simply be a unique name on the Internet, unlike the basic model in FIG. 16 and the extension model 1 in FIG. 28. One solution is using the DNS (Domain Name Server) name of the printer. As FIG. 33 shows, it is assumed that the DNS domain name of the site, protected by the firewall 30, is "abc.com". As long as an Internet connection is maintained, the uniqueness of the DNS domain name is guaranteed.

When the printer DNS name on the site is "exppl.abc.com", address mapping can be executed as follows.

The proxy server URL+ExPM DNS name is specified. In the case of the above example, the public name of the ExPM server 31 on the Internet is "exppproxyl.comnet.com/exppl.abc.com".

The system configuration and functions in FIG. 33 will now be described. The ExPM client 2-1 has the following major functions.

(1) Specifies the print destination.

(2) Connects the ExPM proxy 12 by IPP protocol, acquires the status of the printer 31, and transfers the print job.

(3) Disconnects the session with the ExPM proxy 12 after printing completes.

(4) Searches for a printer on the ExPM proxy 12, as FIG. 34 shows, and displays the printer (spool) list as an optional function.

The ExPM proxy 12 has the following major functions.

(1) Waits for a connection request from the ExPM server 31, and creates a corresponding ExPM server site (spool) 14 if a connection request is received.

(2) Waits for a connection request from the ExPM client 2-1, links with the ExPM server site 14, and establishes a path between the ExPM client 2-1 and the ExPM server 31 if a connection request is received.

(3) Converts the printer status sent from the ExPM server 31 by such a protocol as HTTP/FTP into IPP format, and returns it to the ExPM client 2-1 by IPP.

(4) Converts the job sent from the ExPM client 2-1 by IPP into the protocol (e.g. HTTP/FTP) of the ExPM server 31, and transfers it to the ExPM server 31.

(5) The ExPM proxy 12 releases its support information to the public on the Internet as an ExPM description file to specify the communication protocol with the ExPM server 31, the ExPM server 31 acquires this file by HTTP, and selects an optimum protocol.

(6) Monitors the pipe with the connected ExPM server 31, where the server site is deleted when the ExPM server 31 is shutdown.

(7) Regularly polls the status of the ExPM server 31 if necessary, and mirrors the status to the server site.

The ExPM server 31 has the following major functions.

(1) Automatically connects to the ExPM proxy on the Internet. For the protocol connection, such a TCP protocol as HTTP/FTP is used according to the self-environment.

(2) Mirrors the self-status to the ExPM proxy by such a protocol as HTTP/FTP.

(3) Acquires and prints the job which was transferred from the ExPM client 2-1 to the ExPM proxy 12.

The flow of print processing will now be described with reference to FIG. 33.

[1] When a printer is started up or when a clear instruction is received, the ExPM server 31 establishes a TCP connection to the specified ExPM proxy 12. A TCP connection here refers to a TCP connection which can circumvent the firewall of HTTP/FTP.

[2] The ExPM proxy 12, which is connected with the ExPM server 31, prepares the server site (spool) 14 of the server DNS name "exppl.abc.com". The protocol for connection has no particular restrictions (e.g. HTTP/FTP). Here HTTP is used as an example for description. In the case of HTTP, the connection destination is "http://expp-proxyl.comnet.com/exppl.abc.com".

[3] A connection is established if necessary, and such information as the capability and the status of the ExPM server 31 is transferred to the ExPM proxy 12.

[4] When the user prints, the ExPM proxy specified by the ExPM client 2-1 and the server site created in the step [2] (Internet public name of the ExPM server) are specified. The GUI configuration is shown in FIG. 34. See the diagram below.

In FIG. 34, the ExPM proxy name is specified, then all ExPM servers on the proxy are listed. To generate this list the ExPM client 2-1 acquires it from a specified ExPM proxy 12 using IPP or another protocol.

[5] Based on the information specified in [4], the ExPM client 2-1 connects to the ExPM proxy 12 using IPP. The connection URL is "ipp://expp-proxyl.comnet.com/exppl.abc.com".

[6] The ExPM proxy 12 notifies the status of the printer to the ExPM client 2-1 by IPP.

[7] The ExPM client 2-1 checks the status of the printer, and transfers the print job to the ExPM proxy 12 by IPP.

[8] In the same way, the ExPM proxy 12 converts the received job to a protocol which can circumvent the firewall (e.g. HTTP), and transfers it to the printer 31.

In this way, a fixed pipe is constantly set between the proxy 12 and the server 31, and all connections are performed through this pipe so that a client outside the firewall can use and control a printer inside the firewall using IPP.

Also in this example, the roles of a server and a client of the proxy and the print server are reversed, as described with reference to FIG. 14 and FIG. 15. The blocking method in FIG. 25 is used as the communication format.

[Other Embodiments]

Figure 35:
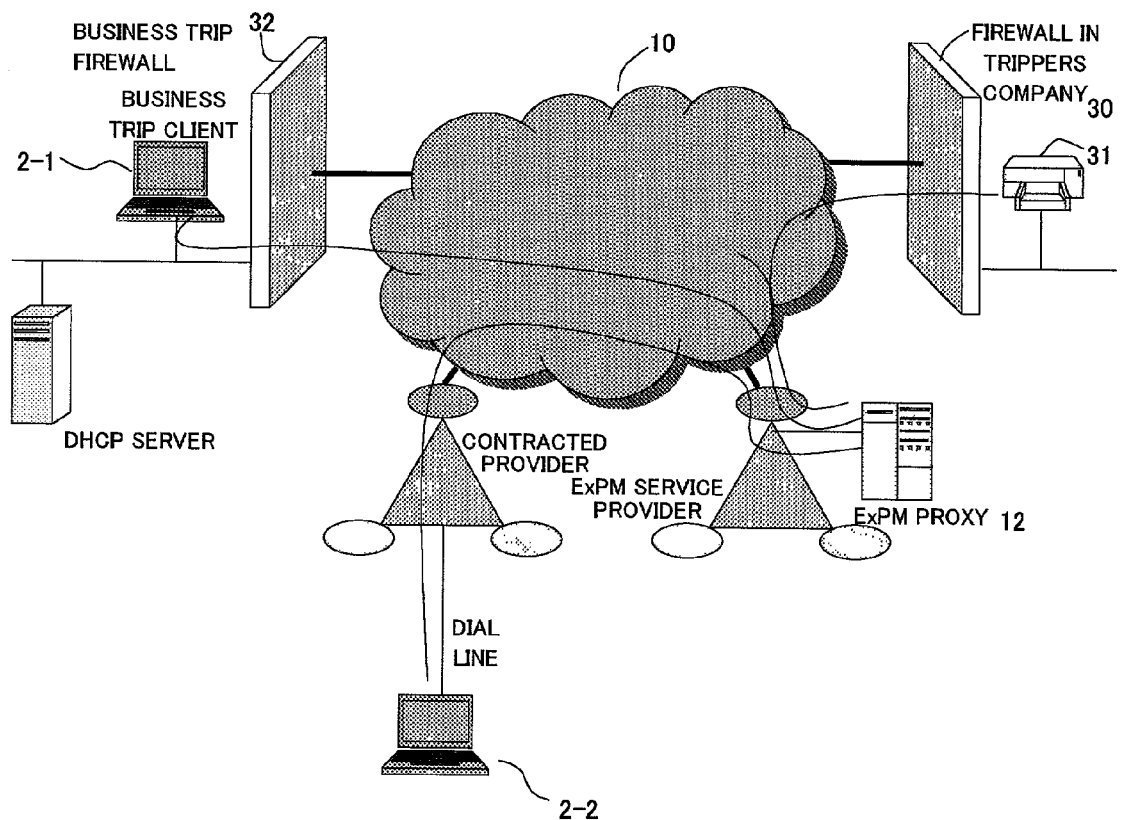
FIG. 35 is a diagram depicting a form of using the system of the present invention.
Figure 36:
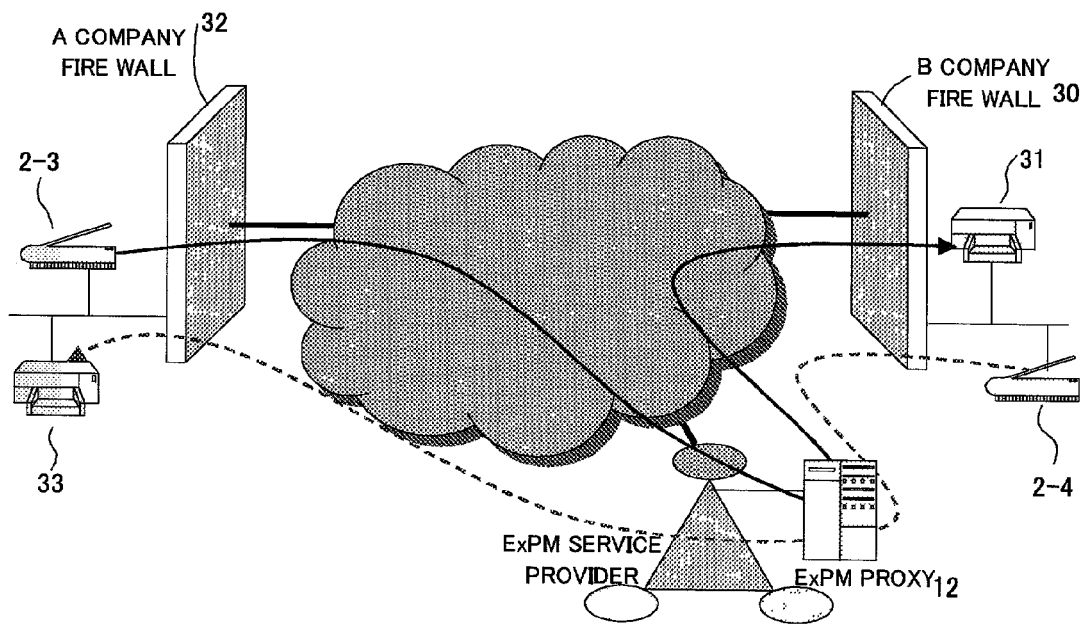
FIG. 36 is a diagram depicting another form of using the system of the present invention.
Figure 37:
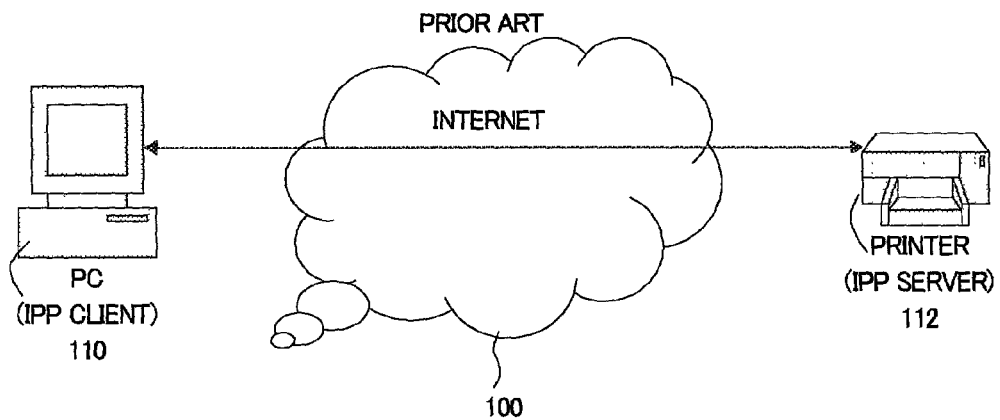
FIG. 37 is a diagram depicting the printing operation by a conventional IPP.
Figure 38:
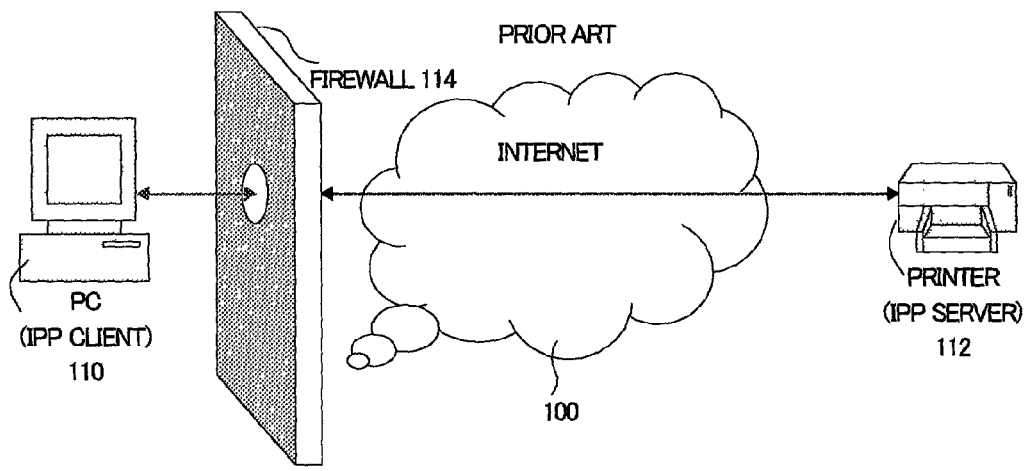
FIG. 38 is a diagram depicting the printing operation when the firewall of a conventional IPP is circumvented.
Figure 39:
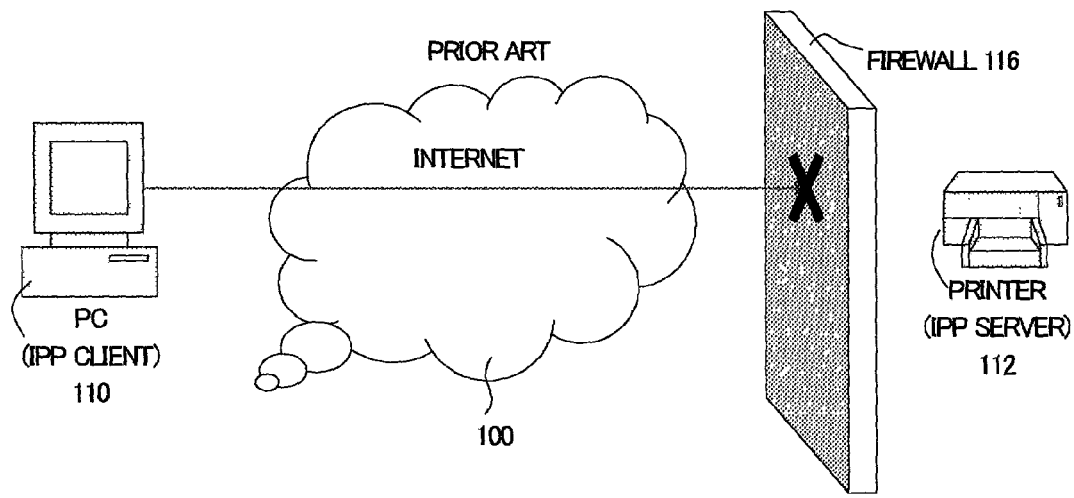
FIG. 39 is a diagram depicting the operation through the firewall of a conventional IPP.

FIG. 35 and FIG. 36 are diagrams depicting forms of using the ExPM of the present invention. FIG. 35 shows an example when an individual on a business trip or an operator working at home prints a created document on the printer 31 located at the company operating the IPP client 2-1 and 2-1 thereof. The provider installs the ExPM proxy 12. In this way, the provider can implement such benefits as increasing the number of subscribers, collecting ExPM service charges, providing ExPM services to users for a fee, and collecting services charges from the company under contract by preventing the connection of printers other than printers of the company.

FIG. 36 is an example when a FAX is sent via the Internet 10 without using an expensive and slow telephone line, where the clients 2-1 and 2-2 are comprised of a FAX (or an original reader). Combining a scanner and a printer implements an Internet FAX function. Also in this case, the provider installs the proxy 12, and a similar expansion benefit can be expected.

Connection time out is set on the printing setup screen of the embodiments in FIG. 3 and FIG. 29. Here the ExPM client 2-1 sends a command mail to the ExPM server 31 using SMTP. If this command mail cannot be received for any reason (e.g. disconnected line, ExPM server site mail server is down), the ExPM client 2-1 sends a cancellation mail to the ExPM server 31 when a time out, which was set, occurs, in order to disconnect the session with the ExPM proxy 12. This is the same as when the ExPM proxy 12 sends a printing command.

The communication protocol between the ExPM server 31 and the ExPM proxy 12 has no particular restrictions. Any protocol which can transfer the router information of an ExPM server site and which an ExPM proxy 12 supports is acceptable. Normally HTTP and FTP are preferred. When an IPP client is installed on the ExPM server 31, IPP can be used by extending the command set of IPP.

The ExPM proxy 12 need not be a standalone server, but may be installed on a conventional proxy server as one service. In the same way, the printing command mail of the basic model and the extension model 1 uses the SMTP of the TCP/IP world, described here as an example. There is also another message transfer service (e.g. MHS described in the X.400 series of ITU-T recommendations).

The present invention presented three models (embodiments). The respective merits/demerits will be summarized below.

Basic Model (SMTP Client is Installed on the ExPM Client)

Merits (1) The ExPM proxy can be easily installed by transmitting request mail from the ExPM client, and installing authentication functions is particularly easy.

(2) Since this is an event driven model where printing is notified by mail, constant connection of a printer and an ExPM proxy is unnecessary.

Demerits (1) Installation is complicated since an ExPM client must support the mail transmission protocol, and the ExPM server must support the mail reception protocol.

(2) A mail server must be prepared at the sites of the client/server since mails are exchanged.

(3) A client must support the mail transmission protocol (e.g. SMTP), so a conventional IPP client cannot be used, and a dedicated client must be created.

(4) A user must know the account of the ExPM client in advance.

Extension Model 1 (SMTP Client is Installed on the ExPM Proxy)

Merits (1) This model can be supported by a standard IPP since it is sufficient for the ExPM client to support only IPP.

(2) Since this is an event driven model where printing is notified by mail, constant connection of a printer and an ExPM proxy is unnecessary.

Demerits (1) Installation is complicated since an ExPM proxy must support the mail transmission protocol, and the ExPM server must support the mail reception protocol.

(2) A mail server must be prepared at the sites of the proxy/server since mail is exchanged.

(3) A user must know the account of the ExPM client in advance.

Extension Model 2 (ExPM Server Active Connection Model)

Merits (1) A mail function is unnecessary, and each component can be easily installed.

(2) There is no dependence on a mail server.

(3) Compatible with a standard IPP client.

(4) Since an ExPM server and an ExPM proxy are constantly connected, an ExPM client can acquire information on an ExPM server via an ExPM proxy. Therefore various search/inquiry functions supported by IPP can be used.

(5) Response is good since there are no delays with mail transfers.

Demerits (1) Not suitable for a dial-up network since this model requires a constant connection.

(2) The resources of a proxy are consumed since an ExPM server is always connected to an ExPM proxy even when not used.

The present invention was described with the embodiments, but various modifications are possible within the scope of the present invention, and these modifications are not excluded from the technical scope of the present invention.

According to this invention, for a print server which cannot circumvent a firewall by Internet Printing Protocol (IPP), a proxy unit which can communicate by IPP is installed, and the server site of the print server is opened on the proxy unit, therefore the client regards the print server as an IPP server opened on the Internet, so as to exchange printing service requests and responses.

Also the proxy unit performs gateway conversion of IPP into another protocol, so the client can print out to a print server circumventing a firewall.

What is claimed is:

1. An Internet printing method comprising:
providing a proxy unit on the Internet;
opening a server site of a print server according to a request from a client and/or the print server, the server site being opened in the proxy unit;
accessing the server site by the client; and
converting a protocol into a protocol which allows circumventing a firewall of the print server, and transferring a printing service request from the client to the print server,
wherein the firewall is provided between the print server and the proxy unit.

2. The Internet printing method according to claim 1, further comprising:
returning an execution result of the printer server for the printing service request to the proxy unit, and returning the execution result to the client from the proxy unit using the Internet Printing Protocol.

3. The Internet printing method according to claim 1, further comprising:
connecting the proxy unit and the print server according to the connection request from the print server.

4. The Internet printing method according to claim 3, wherein the proxy unit plays the role of a server and the print server plays a role of a client when the proxy unit and the print server are connected, and the proxy unit plays a role of a client and the print server plays the role of a server when the printing service is requested after the connection.

5. The Internet printing method according to claim 1, further comprising:
transmitting a printing command from the client to the print server using a protocol which can circumvent the firewall; and
connecting the proxy unit and the print server according to the connection request from the print server corresponding to the printing command.

6. The Internet printing method according to claim 1, further comprising:
a step of transmitting a printing command from the client to the proxy unit using the Internet Printing Protocol;
transferring the printing command from the proxy unit to the print server using a protocol which can circumvent the firewall; and
connecting the proxy unit and the print server according to the connection request from the print server corresponding to the transferred printing command.

7. The Internet printing method according to claim 1, further comprising:
constantly connecting the proxy unit and the print server according to the connection request from the print server.

8. The Internet printing method according to claim 1, wherein the user accesses the server site by the Internet Printing Protocol, the Internet Printing Protocol is converted to a protocol which allows circumventing the firewall of the print server.

9. The Internet printing method according to claim 1, wherein the protocol which does not allow circumventing a firewall is converted to the protocol which allows circumventing the firewall of the print server at the proxy unit.

10. An Internet printing system comprising:
a client that communicates at least by using the Internet Printing Protocol;
a print server that is protected by a firewall on the Internet and for executing a printing service request; and
a proxy unit that opens a server site of the print server according to a request from the client and/or the print server, converts the Internet Printing Protocol used by the client for sending the printing service request into a protocol which allows circumventing the firewall of the print server at the access of the client to the server site, and transfers the request to the print server,
wherein the firewall is provided between the print server and the proxy unit.

11. The Internet printing system according to claim 10, wherein the print server returns the execution result for the printing service request to the proxy unit and the proxy unit returns the execution result to the client using the Internet Printing Protocol.

12. The Internet printing system according to claim 10, wherein the proxy unit is connected to the print server according to the connection request from the print server.

13. The Internet printing system according to claim 12, wherein the proxy unit plays a role of a server and the print server plays a role of a client when the proxy unit and the print server are connected, and the proxy unit plays a role of a client and the print server plays a role of a server when the printing service is requested after the connection.

14. The Internet printing system according to claim 10, wherein the client transmits a printing command to the print server using a protocol which can circumvent the firewall, and the proxy unit connects with the print server according to the connection request from the print server corresponding to the printing command.

15. The Internet printing system according to claim 10, wherein the client transmits a printing command to the proxy unit using the Internet Printing Protocol, and the proxy unit transfers the printing command to the print server using a protocol which can circumvent the firewall, and connects with the print server according to the connection request from the print server corresponding to the transferred printing command.

16. The Internet printing system according to claim 10, wherein the proxy unit is constantly connected with the print server according to the connection request from the print server.

17. A proxy unit comprising:
a server site of a print server to be opened according to a request from a client and/or the print server; and
an exchanger that converts a protocol used by the client for sending a printing service request into a protocol which allows circumventing a firewall of the print server at an access of the client to the server site, and transfers the request to the print server,
wherein the firewall is provided between the print server and the proxy unit.

18. The proxy unit according to claim 17, wherein exchanger receives an execution result of print server for printing service request and returns to the client by the Internet Printing Protocol.

19. The proxy unit according to claim 17, wherein the proxy unit connects with the print server according to the connection request from the print server.

20. The proxy unit according to claim 19, wherein the proxy unit plays a role of a server and the print server plays a role of a client when the proxy unit and the print server are connected, and the proxy unit plays a role of a client and the print server plays a role of a server when the printing service is requested after the connection.

21. The proxy unit according to claim 17, wherein the user accesses the server site by the Internet Printing Protocol, the Internet Printing Protocol is converted to a protocol which allows circumventing the firewall of the print server.

22. A printer server comprising:
a network interface for communicating; and
a processor that requests to a proxy unit installed on the Internet to open a server site of a print server, and receives a printing service request from the proxy unit where a protocol used for a printing service request of the client is converted into a protocol which allows circumventing the firewall of the print server at the access of the client to the server site, and executes the printing service request,
wherein the firewall is provided between the print server and the proxy unit.

23. The print server according to claim 22, wherein the proxy unit plays a role of a server and the print server plays a role of a client when the proxy unit and the print server are connected, and the proxy unit plays the role of a client and the print server plays a role of a server when the printing service is requested after the connection.

24. The printer server according to claim 22, wherein the user accesses the server site by the Internet Printing Protocol, the Internet Printing Protocol is converted to a protocol which allows circumventing the firewall of the print server.

* * * * *